United States Patent
Hastings

(10) Patent No.: US 11,676,057 B2
(45) Date of Patent: Jun. 13, 2023

(54) CLASSICAL AND QUANTUM COMPUTATION FOR PRINCIPAL COMPONENT ANALYSIS OF MULTI-DIMENSIONAL DATASETS

(71) Applicant: MICROSOFT TECHNOLOGY LICENSING, LLC, Redmond, WA (US)

(72) Inventor: Matthew Benjamin Hastings, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 828 days.

(21) Appl. No.: 16/524,505

(22) Filed: Jul. 29, 2019

(65) Prior Publication Data

US 2021/0035002 A1 Feb. 4, 2021

(51) Int. Cl.
| | |
|---|---|
| *G06N 10/00* | (2022.01) |
| *G06F 15/16* | (2006.01) |
| *G06F 17/16* | (2006.01) |
| *G06N 7/00* | (2006.01) |
| *G06N 20/00* | (2019.01) |
| *G06N 7/01* | (2023.01) |

(52) U.S. Cl.
CPC ............. *G06N 10/00* (2019.01); *G06F 15/16* (2013.01); *G06F 17/16* (2013.01); *G06N 7/01* (2023.01); *G06N 20/00* (2019.01)

(58) Field of Classification Search
CPC ......... G06F 15/16; G06F 17/16; G06N 10/00; G06N 20/00; G06N 7/005
See application file for complete search history.

(56) References Cited

U.S. PATENT DOCUMENTS

| | | | | |
|---|---|---|---|---|
| 2017/0364796 | A1* | 12/2017 | Wiebe | G06N 10/00 |
| 2020/0019879 | A1* | 1/2020 | Xue | G06N 7/005 |
| 2020/0279185 | A1* | 9/2020 | Wiebe | G06F 17/18 |

OTHER PUBLICATIONS

"Classical and Quantum Algorithms for Tensor Principal Component Analysis", In Repository of arXiv:1907.12724, Jul. 30, 2019, 29 Pages.

Wein, et al., "The Kikuchi Hierarchy and Tensor PCA", In Repository of arXiv:1904.03858, Oct. 1, 2019, 42 Pages.

(Continued)

*Primary Examiner* — Terrell S Johnson
(74) *Attorney, Agent, or Firm* — Holzer Patel Drennan

(57) ABSTRACT

Classical and quantum computational systems and methods for principal component analysis of multi-dimensional datasets are presented. A dataset is encoded in a tensor of rank p, where p is a positive integer that may be greater than 2. The classical methods are based on linear algebra. The quantum methods achieve a quartic speedup while using exponentially smaller space than the fastest classical algorithm, and a super-polynomial speedup over classical algorithms that use only polynomial space. In particular, an improved threshold for recovery is achieved. The presented classical and quantum methods work for both even and odd ranked tensors. Accordingly, quantum computation may be applied to large-scale inference problems, e.g., machine learning applications or other applications that involve highly-dimensional datasets.

20 Claims, 10 Drawing Sheets

(56) References Cited

OTHER PUBLICATIONS

Daskin, Ammar, "Obtaining a Linear Combination of the Principal Components of a Matrix on Quantum Computers", In the Journal of Quantum Information Processing, Jul. 19, 2016, pp. 4013-4027.
"International Search Report and Written Opinion Issued in PCT Application No. PCT/US2020/039404", dated Oct. 9, 2020, 26 Pages.

* cited by examiner

CLASSICAL AND QUANTUM COMPUTATION FOR PRINCIPAL COMPONENT ANALYSIS OF MULTI-DIMENSIONAL DATASETS

BACKGROUND OF THE INVENTION

Principal component analysis (PCA) is often employed to reduce the dimensionality of and/or de-noising of datasets. PCA involves finding the principal components of a multi-dimensional dataset. The datasets are often encoded in a tensor structure and/or tensor-based data structure. To find the principal components of a matrix (i.e., a rank-2 tensor), conventional linear algebra methods may be employed. However, such conventional linear algebra methods are not readily applicable for higher ranked tensors, e.g., tensors where the rank is greater than 2. Various conventional statistical models have been applied to the task of determining the principal components of "well-behaved" higher-ranked tensors. Even when these conventional statistical approaches are applicable for the task, the time and/or space complexity of such conventional computations often renders the task of determining the principal components of higher-ranked tensors impractical on classical computing devices.

SUMMARY OF THE INVENTION

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The various embodiments are directed to classical and computational methods and systems for the principal component analysis (PCA) of multi-dimensional datasets. The dataset may be a "noisy" dataset. The embodiments may be employed to find one or more vectors within the data set that correspond to the "signal" in the noisy dataset. The dataset may be encoded in a tensor of rank p, where p is an integer greater than 1. Because the tensor may be "spiked" with noise, the tensor may be a spiked tensor, indicated as $T_0$. In various embodiments, the rank-p of $T_0$ is greater than 2. Because the methods are enabled to detect noise in the dataset and recover the signal vector (indicated as $v_{sig}$), the various embodiments may be employed to "de-noise" the dataset. $v_{sig}$ may indicate a principal component of the noisy dataset. Furthermore, the embodiments may be employed to reduce the dimensionality of the dataset via the recovering the principal components of the dataset. Thus, the embodiments may be employed to reduce the complexity of the analysis of highly dimensional datasets. For example, the embodiments include applications to various machine learning and/or artificial intelligence tasks.

The embodiments include methods, employable on classical computing devices and systems (e.g., computing systems that process information via quantized units, such as but not limited to digital bits). These methods may employ various spectral algorithms, and are applicable for both even and odd values of p that are greater than 2. The various embodiments include methods that are employable on quantum-based computing systems. That is, these quantum embodiments are implementable on systems that process information via qudits, including qubits (e.g., 2 dimensional and/or 2 eigenstate qudits), as well as qudits of dimensionality greater than 2. These quantum-based embodiments may determine the single particle density matrix of the leading eigenvector of Hamiltonian that is defined by $T_0$. The tensor-dependent Hamiltonian may be referred to as $H(T_0)$. The quantum embodiments may be applied to matrices other than $H(T_0)$. In at least some embodiments, the quantum-based embodiments employ the single particle density matrix of eigenvectors other than the leading (or dominant) eigenvector of $H(T_0)$. For example, an eigenvector, which may not be the leading eigenvector, but passes an eigenvalue threshold test (which indicates its projection of the eigenspace defined by the leading eigenvalue) may be employed.

DETAILED DESCRIPTION OF THE PREFERRED EMBODIMENTS

Figure 1:
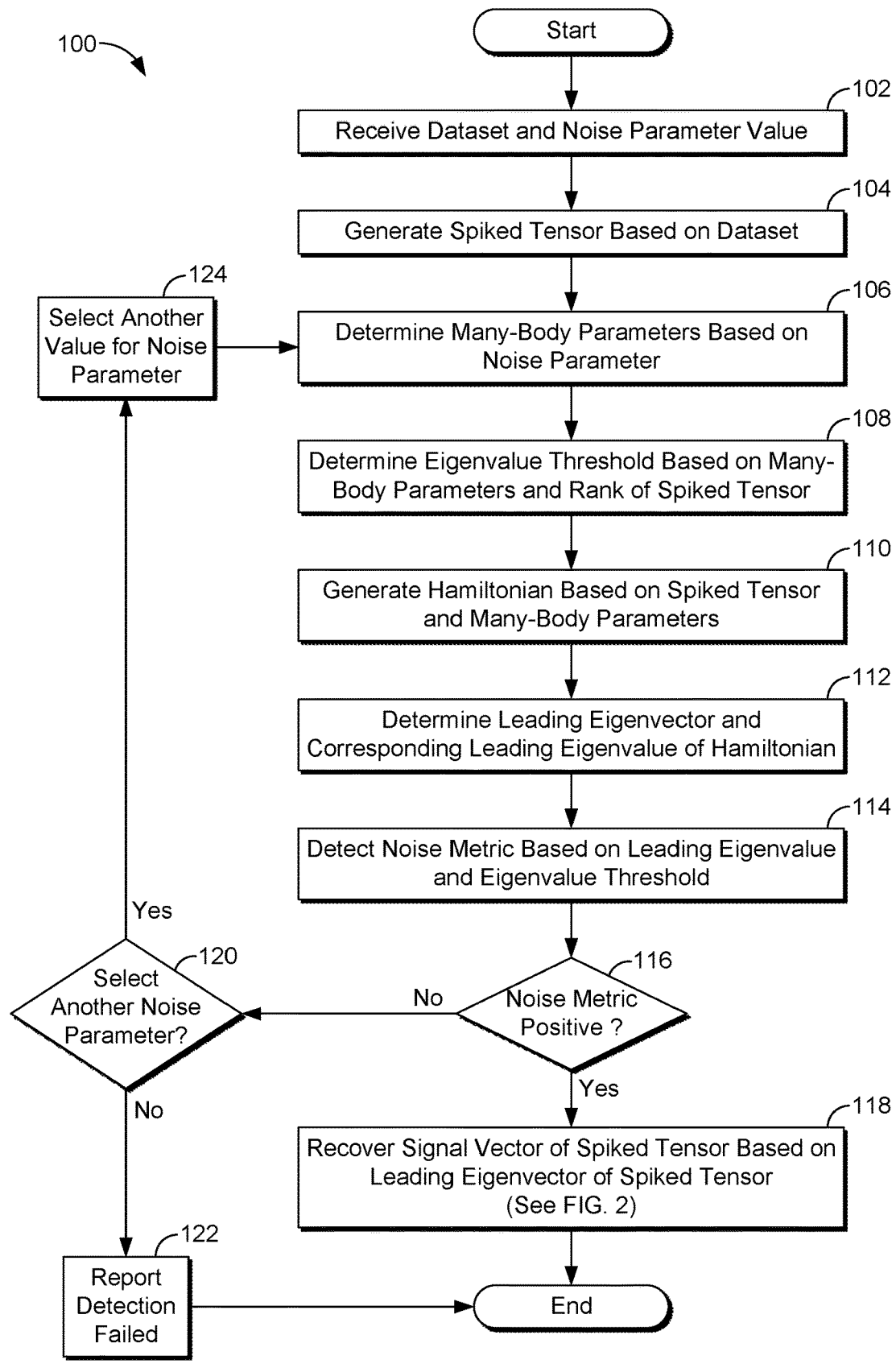
FIG. 1 provides a flow diagram that illustrates an enhanced method for detecting and recovering a signal within a dataset, via classical computing systems, that is consistent with some of the embodiments.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a quantum computing process, a classical computing process, and/or a combination thereof that may be performed using any combination of quantum and/or classical hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

As used herein, the term "set" may be employed to refer to an ordered (i.e., sequential) or an unordered (i.e., non-sequential) collection of objects (or elements), such as but not limited to qubits. A set may include N elements (e.g., qubits), where N is any non-negative integer. That is, a set may include 0, 1, 2, 3, ... N objects and/or elements, where N is an positive integer with no upper bound. Therefore, as used herein, a set may be a null set (i.e., an empty set), that includes no elements. A set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

Some of the disclosed embodiments include enhanced methods that are implementable via classical computing means. As used herein, terms such as "classical computing means," "classical computing system," and "classical computing device" may refer to computing devices, systems, and/or other hardware that process information via digital bits, or similar and/or analogous digital means. These embodiments may be referred to as enhanced classical embodiments (or simply as classical embodiments), classical-based embodiments, or the like. As used herein, the term "classical," is not meant to indicate that the classical embodiments are conventional and/or included in prior art. Rather, the term "classical" refers to the basis of information processing (i.e., digital means). Even when not explicitly stated through, each of the classical embodiments is an enhanced embodiment, and does not include conventional means. As used herein, terms such as "quantum computing means," "quantum computing system," and "quantum computing devices" may refer to computing devices and/or other hardware that process information via quantum means, e.g., qubits, qudits, and other quantum information means. These embodiments may be referred to as enhanced quantum embodiments (or simply as classical embodiments), quantum-based embodiments, or the like. Similar to the classical embodiments, even when not explicitly stated through, each of the quantum embodiments is an enhanced embodiment, and does not include conventional means.

Briefly stated, the various embodiments are directed towards classical and quantum computing methods and systems for determining the principal components of a p-rank (or order p) tensor, where p is any integer greater than 1. In some embodiments, p is an integer greater than 2. Principal component analysis (PCA) is a fundamental technique that finds applications in reducing the dimensionality of and/or de-noising data. Thus, the embodiments may be employed in any application that includes multi-dimensional datasets, such as but not limited to artificial intelligence (e.g., machine learning, computer vision, autonomous vehicles, and other such application), computer/network security, recommendation systems, and the like. Conventional PCA methods, which employ linear algebra, are not applicable for tensors of ranks higher than 2. The application of conventional statistical models to the PCA of tensors of higher ranks, via classical computing means, has been explored by others. However, when implemented on classical computing devices, the time and space complexity of the required computations renders these conventional statistical methods impractical for all but the simplest of datasets. Furthermore, even for simple datasets, some of these conventional classical computing methods may be applicable only on datasets where p is even. The various embodiments disclosed herein include enhanced classical methods and systems, implementable on classical computing systems, that can determine the principal components of a dataset, for both even and odd values of p that are greater than 2. The embodiments also include various quantum computing methods and systems for determining the principal components for both even and odd values p that are greater than 2. The quantum embodiments provide significant reductions in both the time and the space complexity, rendering the determination of the principal components practical for higher ranked tensors.

The embodiments employ an enhanced "spiked tensor" statistical model. The spiked tensor model includes selecting (e.g., a random or pseudo-random selection) an unknown vector $v_{sig} \in \mathbb{R}^N$; and modeling the p-rank tensor ($T_0$) as:

$$T_0 = \lambda v_{sig}^{\otimes p} + G, \qquad (1)$$

where $v_{sig}^{\otimes p}$ is a p-rank "signal" tensor, $G \in \mathbb{R}^{N \otimes p}$ is a p-rank "noise" tensor selected from a random distribution, and $\lambda$ is a scalar value indicating a signal-to-noise ratio. One PCA task, referred to as "recovery," includes determining $v_{sig}$ (or at least some approximation thereof) given $T_0$. That is, recovery refers to "recovering" the signal tensor from a linear combination of the signal and noise tensors (i.e., $T_0$). Another PCA task, referred to as "detection," includes distinguishing the case $\lambda=0$ from $\lambda=\bar{\lambda}$ for some $\bar{\lambda}>0$. That is, detection refers to "detecting" whether an observable signal is present in the $T_0$.

In the various embodiments, $T_0$ may be observed from noisy data (e.g., a dataset that may be employed in a machine learning application). In exemplary, but non-limiting, embodiments, the entries of G may be independently modeled as being selected from a Gaussian (or other statistical) distribution of zero mean and unit variance, and $|v_{sig}|=\sqrt{N}$. In other embodiments, the type of the statistical distribution, as well as the parameters of the statistical noise distribution, may vary.

Conventional spectral algorithms, as well as conventional sum-of-squares algorithms, have been been applied to PCA of tensors of p greater than 2. However, for $\lambda$ much larger than $N^{1-p/2}$, these conventional approaches do not appear to recover $v_{sig}$ in polynomial time. Furthermore, these conventional approaches may not be applicable for all $T_0$ of odd values of p. For a spectral approach, a matrix is formed from $T_0$ (if p is even, the matrix is $N^{p/2}$-by-$N^{p/2}$, with its entries given by entries of $T_0$) and the leading eigenvector of the matrix may be employed to determine $v_{sig}$. For even p, a conventional spectral method may be employed for A much larger than $N^{-p/4}$, and a variant of it is conjectured to perform similarly for odd p. Conventional methods based on the sum-of-squares may also perform similarly to the conventional spectral method. More particularly, the conventional sum-of-squares method may provide a sequence of algorithms, in which $T_0$ is recoverable with $\lambda$ smaller than $N^{-p/4}$ at the cost of runtime and space increasing exponentially in polylog(N)$N^{-p/4}/\lambda$.

Various classical embodiments provide an enhanced spectral-based method for the PCA of p-ranked tensors, where p may be greater than 2. Furthermore, the enhanced spectral methods of the various embodiments are applicable for both even and odd values of p. The enhanced spectral methods are implementable on classical and/or digital computation devices. There are several distinctions of enhanced spectral methods, with respect to the conventional spectral approaches. The enhanced spectral methods provide an improved threshold for recovery for even p, at least because the enhanced spectral methods employ a randomized method for recovery. Furthermore, the enhanced spectral embodiments include a separate method for p of odd values. A proof that the embodiments for odd p is provided below. Currently, there is no known proof for the soundness of conventional methods applied to tensors of odd values of p. In the various embodiments and for both even and odd p, provable bounds on recovery for $\lambda$ of order $N^{p-/4}$ (without any polylogarithmic factors) are provided. The embodiments further provide a sequence of methods that are applicable for $\lambda$ small compared to $N^{-p/4}$.

The quantum embodiments further include various quantum computation methods (e.g., quantum algorithms) for the PCA of tensors of all p values. These quantum-based embodiments achieve a quartic speedup and exponential reduction in space. The quantum embodiments employ at least two concepts and/or approaches. The first concept includes employing phase estimation and amplitude amplification to obtain a quadratic speedup in computing the largest eigenvector. The second concept employs a selected input state to obtain a further quadratic speedup, providing an overall quartic speedup.

In contrast to the conventional spectral-based approaches, the disclosed embodiments are not motivated via the Kikuchi free energy. Rather than the Kikuchi free energy, the embodiments are motivated by mean-field approximations to quantum many-body systems. For example, the quantum embodiments model a system of $n_{bos}$ of qudits, where $n_{bos}$ is any integer greater than 1. Each qudit includes N dimensions (or eigenstates), where N is an integer greater than 1. In the various embodiments, a quantum Hamiltonian for the system qudits, based on the tensor $T_0$, is generated. Increasing $n_{bos}$ gives rise to a sequence of algorithms, with increased runtime but improved performance. The required $n_{bos}$ increases polynomially in $\lambda^{-1}$, but the runtime increases exponentially. It should be noted that the quantum embodiments are not limited to qudits are not limited to N being greater than 2. That is, the various embodiments may employ qubits.

In a symmetric subspace, the $n_{bos}$ qudits may be considered as a system of interacting bosons. In the case p=4, for example, the Hamiltonian may include pairwise interaction terms for all pairs of qudits. Via mean-field theory and for large values of $n_{bos}$, the Hamiltonian's leading eigenvector of the problem may be approximated by a product state. For such a mean-field approximation to be accurate, the bounds for arbitrary pairwise Hamiltonians may require rather large values for $n_{bos}$ for a given N. However, as shown below, enhanced statistical models employed in the above mean-field approximation enable accurate mean-field approximations at much smaller values of $n_{bos}$, based upon the value of $\lambda$. In this mean-field regime, the product state is a product of a single particle state, and this single particle state is provided by $v_{sig}$, regarding the vector $v_{sig}$ as a vector in the single-particle Hilbert space. Then, the single particle density matrix enables at least an approximate recovery of $v_{sig}$.

Implementing spectral-based approaches on classical (e.g., digital) computing devices may require high-dimensional linear algebra, to determine the leading eigenvector of a matrix of dimension$\approx N^{n_{bos}}$. Accordingly, the quantum-based embodiments are advantageous for such applications. In the embodiments, the Hamiltonian may be efficiently simulated. This enables embodiments based on preparing a random initial state of qudits and then phase estimation to project onto the leading eigenvector. The probability of success in this projection is inverse in the dimension of the matrix. In some embodiments, this approach may not provide a speedup over classical computing means. However, other quantum-based embodiments employ amplitude amplification to provide a quadratic speedup over classical computation means. Still other embodiments employ the tensor $T_0$ to prepare an input state for quantum computation that enables an improved overlap with the leading eigenvector. These quantum-based provide a quartic speedup over classical computation means.

When comparing the quantum-based embodiments to classical computing means, the discussed reductions in space and time computational complexities are based on the power method or similar algorithms, such as but not limited to Lanczos. These conventional algorithms may require exponential space while the enhanced quantum-based embodiments may require polynomial space. Furthermore, the enhanced classical computational embodiments algorithms may require polynomial space, while the quantum-based embodiments may enable super-polynomially speedup, as compared to the digitally implementable embodiments.

Notations Employed for Disclosing the Various Embodiments

The following definitions and notations may be employed throughout. A tensor T of order p and dimension N may be a multi-dimensional array. The entries of the tensor may be written $T_{\mu_1, \mu_2, \ldots, \mu_p}$ where $p \geq 1$ is an integer and each $\mu_a$, ranges from $1, \ldots, N$. Two variants of the tensor may be considered, one in which entries of the tensor are real numbers, and one in which the entries may be complex numbers, so that either $T \in (\mathbb{R}^N)^{\otimes p}$ or $T \in (\mathbb{C}^N)^{\otimes p}$. A tensor with all real-valued entries real may be referred to as a real tensor. While a tensor with at least some of the entries comprising complex values may be referred to as a complex tensor. A symmetric tensor may be one that is invariant under permutation of its indices. The symmetrization of a tensor may be equal to 1/p! times the sum of tensor given by permuting indices.

A spiked tensor model for given N and a give p is defined as follows. Let $v_{sig}$ be a vector in $\mathbb{R}^N$, normalized by $|v_{sig}|=\sqrt{N}$, chosen from some probability distribution; this is the "signal vector". Let G be a real tensor of order p with entries chosen from a Gaussian (or other statistical) distribution. As such, G may be a "noise" tensor. As noted above, $T_0 = \lambda v_{sig}^{\otimes p} + G$, where $v_{sig}^{\otimes p}$ may be defined as the tensor with entries $$(v_{sig}^{\otimes p})_{\mu_1, \ldots, \mu_p} = \prod_{a=1}^{p} (v_{sig})_{\mu_a}.$$

A subscript on a vector may indicate an entry (or component) of that vector. A similar subscript notation may also be employed for matrices, or higher order tensors. As noted above, the distribution employed modeling the noise included in G is not limited to Gaussian, and other distribution may be employed, e.g., a biased distribution on $\{-1, +1\}$.

The tensor $v_{sig}^{\otimes p}$ may be symmetric, or at least symmetrized as noted above. Thus, when discussing the various embodiments, is may be assumed that $T_0$ indicates a symmetric tensor. Information is not lost by the symmetrization process, since a tensor $T_0$ may be symmetrized, and then the Gaussian (or other type of) noise may be chosen to vanish under symmetrization. A tensor drawn from the same distribution as $T_0$ may be generated. That is embodiments where G is symmetrized may be reduced to embodiments where G is not symmetrized, and vice-versa.

Some embodiments may be generalized such that G is selected to have complex entries, with each entry having real and imaginary parts chosen from a Gaussian (or other statistical, e.g., a biased) distribution with vanishing mean and variance ½. These values for the mean and variance of the statistical distribution are not intended to be limiting. Such complex embodiments may be referred to as a complex ensemble, while the embodiments where G has real entries may be referred to as a real ensemble. In the embodiments where the variance is reduced to ½ may enable a convenient normalization. Because $v_{sig}$ is real, the real part of $T_0$ may be selected to reduce the embodiments where G includes complex entries to the real case (up to an overall re-scaling for the different variance). Similarly, the real case may be reduced to the complex case (again up to an overall re-scaling) by adding Gaussian distributed imaginary terms to the entries of $T_0$. As shown below, for odd p, it may be convenient to not to symmetrize $T_0$ and to take complex G, while for even p this may not be required. It may be possible to avoid doing this for odd p (which may improve the detection and recovery threshold of the methods by constant factors). p may be treated as fixed in the asymptotic notation. A polynomial in N may refer to a polynomial independent of the parameter $n_{bos}$. The polynomial may, however, depend on p, such as $N^p$.

For at least some p-dependent constant $\theta > 0$, it may be assumed that $n_{bos} = O(N^\theta)$ f is selected to be sufficiently small. Such a selection may be useful to simplify some of the statements of the results to avoid having to specify the allowed range of $n_{bos}$ in each case. For example, a quantity such as $n_{bos}^p/N$ is $o(1)$, meaning that we must take $\theta < 1/p$. An exact value of $\theta$ may be inferred from the below proofs. Similarly, for some p-dependent constant $\theta' > 0$, it may be assumed that that $\lambda$ is equivalent to, or at least approximates, $\Omega(N^{-\theta'})$. Again, this assumption may simplify some of the statements of the results. In embodiments where it is assumed that $n_{bos} = O(N^\theta)$, the required $n_{bos}$ may increase polynomially with $\lambda^{-1}$. This assumed lower bound on $\lambda$ need not further restrict the results. In big-O notation and for some embodiments, it may be assumed that $\lambda = O(1)$ Larger values of $\lambda$ need not be considered because one of the simpler spectral methods (for example, with $n_{bos} = 1$) succeeds if $\lambda$ is not $O(1)$.

The notation $\mathbb{E}[\ldots]$ may indicate expectation values and the notation $\Pr[\ldots]$ may indicate a probability. Usually these are expectation values or probabilities over choices of G. Although, in some embodiments, expectation values over other random variables are considered. The notation $\|\ldots\|$ may indicate the operator norm of an operator, i.e., the absolute value of the largest singular value. The notation $|\ldots|$ may indicate either the $\ell_2$ norm of a tensor or the $\ell_2$ norm of a quantum state. The logarithms may be natural logarithms. However, the embodiments are not so limited, and other bases for the logarithm functions may be employed. The notation $\langle \ldots | \ldots \rangle$ may indicate inner products. The bra-ket notation is employed throughout both for vectors and for quantum mechanical states. The notation c, c', ... may indicate various scalar constants.

Recovery

In this section, enhanced recovery methods are discussed. More particularly, various randomized procedures for recovery, which may be useful in boosting the threshold, are discussed and defined. The correlation between two vectors by a normalized overlap may be determined as:

$$\text{corr}(x, y) = \frac{|\langle x | y \rangle|}{|x| \cdot |y|}. \tag{2}$$

At least one of the embodiments include methods that determine and/or generate a vector x with large $\text{corr}(x, v_{sig})$. Strong recovery may refer to the condition that $\text{corr}(x, v_{sig}) = 1 - o(1)$. In various embodiments, a weaker correlation may be "boosted" to enable strong recovery. One or more iterations of the the tensor power algorithm may be applied to particular vector u to generate a new vector x such that, with high probability, $$\text{corr}(x, v_{sig}) \geq 1 - c\lambda^{-1} \text{corr}(u, v_{sig})^{1-p} n^{(1-p)/2}, \tag{3}$$

where c is a constant depending on p.

So, for any $\lambda \omega(n^{(1-p)/2})$, if $\text{corr}(u, v_{sig}) = \Omega(1)$, then $\text{corr}(x, v_{sig}) = 1 - o(1)$. Thus, a vector u which has, with high probability, $\text{corr}(u, v_{sig}) = \Omega(1)$, may be generated. This is termed weak recovery. For $\lambda$ close to $n^{-p/4}$, one may have polynomially small $\text{corr}(u, v_{sig})$.

Various enhanced spectral methods may output a matrix, indicated as $\rho_1$. This matrix may be a positive semi-definite Hermitian matrix with trace 1. In physics terms, such a matrix is termed a density matrix. For sufficiently large $\lambda$, the leading eigenvector of the matrix may include a large overlap with $v_{sig}$. However, for smaller $\lambda$, a lower bound that, with high probability, $\langle v_{sig} | \rho_1 v_{sig} \rangle = \Omega(1) |v_{sig}|^2$ may exist. An enhanced randomized method, shown in algorithm 1, may be employed to obtain weak recovery. This method enables an improvement to the threshold over conventional recovery methods that include simply using the leading eigenvector of the matrix since it works at smaller values of $\lambda$.

The following corollary follows from the above observations.

Corollary 1. Given an algorithm that, with high probability, outputs a density matrix $\rho$ with $$\frac{\langle v_{sig} | \rho_1 v_{sig} \rangle}{N} = \Omega, \tag{1}$$

then in polynomial time, with high probability, strong recovery is possible.

It may be stated that such an algorithm achieves recovery.

A method is provided via algorithm 1 for the case that the matrix $\rho_1$ may be complex; if the matrix is real, then a real Gaussian distribution may be sampled and the proof of lemma 1 follows with slightly different constants.

---
Algorithm 1 Input: density matrix ρ. Output, some vector w obeying bounds described above
---
1. Randomly sample a vector u with entries chosen from a correlated complex Gaussian distribution with zero mean and with co-variance $\mathbb{E}[\bar{u}_i u_j] = (\rho)_{ij}$, with $\mathbb{E}[u_i u_j] = \mathbb{E}[\bar{u}_i \bar{u}_j] = 0$.
2. Let w = u/|u|.
---

Lemma 1 and the proof of lemma 1 are provided below.
Lemma 1. For algorithm 1, with probability at least ½, $$\langle w | v_{sig} \rangle \geq c \cdot \sqrt{\langle v_{sig} | \rho v_{sig} \rangle}, \quad (4)$$

for some scalar c'>0.
Proof. We have $\mathbb{E}[|u|^2] = \text{tr}(\rho) = 1$. Hence, with probability at least ¾ we have that $|u|^2 \leq 4/3$. We have $\mathbb{E}[|\langle u | v_{sig} \rangle|^2] = \langle v_{sig} | \rho v_{sig} \rangle$ and since $\langle u | v_{sig} \rangle$ is a Gaussian random variable with mean 0, with probability at least ¾ its absolute value is at least some positive constant c" (the exact constant can be deduced from the error function) times its standard deviation. Hence, the lemma follows for c'=(¾)c". □

Spectral Algorithm

A spectral-based method for the spiked tensor problem for the case of both even and odd p will now be discussed. In the below subsection "Hamiltonian Definition," a Hamiltonian H(T) is defined for a given an arbitrary tensor T. Then, in the further below subsection "Spectral Algorithms," the spectral-based method is shown via algorithm 2, which is in terms of $H(T_0)$.

For even p, the Hamiltonian provided may be encoded in a matrix Y. This matrix Y may be generated by projecting the Hamiltonian of Eq. (5) into the subspace spanned by $|\mu_1\rangle \times |\mu_2\rangle \otimes \ldots \otimes |\mu_{p/2}\rangle$ with $\mu_1, \ldots, \mu_{p/2}$ all distinct. The relative reduction in the size of the matrix may be O(1/N) in the limit of large N.

In such embodiments, the largest eigenvalue of the matrix $H(\lambda v_{sig}^{\otimes p})$ may be determined by exploiting an O(N) rotational symmetry of the basis. The corresponding eigenvalue may be independent of $v_{sig}$. Notation employing creation and annihilation operators, may be used throughout, which may which assist in making this rotational symmetry more explicit.

Hamiltonian Definition

For even p, given a tensor T Hamiltonian (H(T)) is defined in equation 5. This Hamiltonian is a linear operator on a vector space $(\mathbb{R}^n)^{\otimes n_{bos}}$, for integer $n_{bos} \geq 1$ chosen below. Basis elements of this space may be indicated as $|\mu\rangle \times |\mu_2\rangle \otimes \ldots \otimes |\mu_p/2\rangle$.. This space may be referred to as the full Hilbert space. The Hamiltonian is defined as follows:

$$H(T) = \frac{1}{2} \sum_{i_1,\ldots,i_{p/2}} \left( \sum_{\mu_1,\ldots,\mu_p} T_{\mu_1,\mu_2,\ldots,\mu_p} |\mu_1\rangle_{i_1} \right. \quad (5)$$

$$\left. \langle \mu_{1+p/2}|\otimes|\mu_2\rangle_{i_2} \langle \mu_{2+p/2}|\otimes\ldots\otimes|\mu_{p/2}\rangle_{i_{p/2}} \langle \mu_p| + h.c. \right),$$

where the sum is over distinct $i_1, i_2, \ldots, i_{p/2}$ so that there are (p/2!) $\binom{n_{bos}}{p/2}$ terms in the sum and where h.c. indicates adding the Hermitian conjugate of the given terms, so that $H_S(T)$ is Hermitian and where $|\mu\rangle_i \langle v|$ denotes the operator $|\mu\rangle \langle v|$ on qudit i. In some embodiments, $n_{bos} \geq p/2$, or else H(T) is trivially zero.

If T is real and symmetric, then the term $E_{\mu_1,\ldots,\mu_p} T_{\mu_1,\mu_2,\ldots,\mu_p} |\mu_1\rangle_{i_1} \langle \mu_{1+p/2}|\otimes|\mu_2\rangle_{i_2} \langle \mu_{2+p/2}|\otimes \ldots \otimes |\mu_{p/2}\rangle_{i_{p/2}} \langle \mu_p|$ may be Hermitian. This $H_S(T)$ can be regarded as a Hamiltonian acting on a space of $n_{bos}$ qudits, each of dimension N, and with interaction between sets of p/2 particles at a time determined from T.

Some non-limiting embodiments are restricted to the symmetric subspace of this Hilbert space. In such embodiments, $D(N, n_{bos})$ may indicate the dimension of this subspace. For $N \gg n_{bos}$, the following approximation may be applicable $D(N, n_{bos}) \approx N^{n_{bos}}/n_{bos}!$.

Within the symmetric subspace, the so-called "second-quantized" Hamiltonian may be formulated as:

$$H(T) = \frac{1}{2}\left( \sum_{\mu_1,\ldots,\mu_p} T_{\mu_1,\mu_2,\ldots,\mu_p} \left( \prod_{i=1}^{p/2} a_{\mu_i}^\dagger \right) \left( \prod_{i=p/2+1}^{p} a_{\mu_i} \right) + h.c. \right). \quad (6)$$

This replacement by a second-quantized Hamiltonian may provide a convenient notation. The operators $a_\mu^\dagger, a_\mu$ are bosonic creation and annihilation operators, obeying canonical commutation relations $[a_\mu, a_v^\dagger] = \delta_{\mu,v}$. Some embodiments may be restricted to the subspace with a total of $n_{bos}$ bosons, i.e., we define the number operator n by $$n \equiv \sum_\mu a_\mu^\dagger a_\mu, \quad (7)$$

and restrict to $n = n_{bos}$. An orthonormal basis of states for this symmetric subspace may be given by all states equal to some normalization constant multiplying $a_{\mu_1}^\dagger a_{\mu_2}^\dagger \ldots$ $$a_{\mu_{n_{bos}}}^\dagger |0\rangle,$$

where $|0\rangle$ is the vacuum state (i.e., the state annihilated by $a_\mu$ for all $\mu$), and where $\mu_1 \leq \mu_2 \leq \ldots \leq \mu_{n_{bos}}$ is some sequence.

For odd p, the Hamiltonian H(T) may be defined in equation 9. Given a tensor T of odd order p, another tensor $\tilde{T}$ of even order q=2(p−1), may be defined, with components $$\tilde{T}_{\mu_1,\ldots,\mu_{(p-1)/2},v_1,\ldots,v_{(p-1)/2},\mu_{(p-1)/2+1},\ldots,\mu_p,v_{(p-1)/2},\ldots,v_p} = \quad (8)$$

$$\sum_\sigma T_{\mu_1,\ldots,\mu_{p-1},\sigma} T_{v_1,\ldots,v_{p-1},\sigma}.$$

Then odd p $H(T) = H(\tilde{T})$ may be defined using the definition above for H(T). Note the order of indices on the left-hand side of Eq. (8). Using the second-quantized notation, this gives for odd p:

$$H(T) = \quad (9)$$

$$\frac{1}{2}\left( \sum_{\mu_1,\ldots,\mu_{p-1}} \sum_{v_1,\ldots,v_{p-1}} \sum_\sigma T_{\mu_1,\mu_2,\ldots,\mu_{p-1},\sigma} T_{v_1,v_2,\ldots,v_{p-1},\sigma} \left( \prod_{i=1}^{(p-1)/2} a_{\mu_i}^\dagger a_{v_i}^\dagger \right) \right.$$

$$\left. \left( \prod_{i=(p-1)/2+1}^{p-1} a_{\mu_i} a_{v_i} \right) + h.c. \right),$$

In some embodiments, $n_{bos} \geq p-1$ as otherwise H(T) is trivially zero. For this Hamiltonian, it may be convenient to take G from the complex ensemble because, as explained below, it makes $\mathbb{E}[H(G)]$ equal to zero, as well as canceling out certain terms in higher order moments, making the proof of the spectral properties of H(G) simpler. To what extent using the complex ensemble can be avoided is discussed below.

Spectral Algorithms

An enhanced spectral algorithm for detection and recovery is provided via algorithm 2. In this subsection the correctness of this algorithm is discussed, using statistical properties of H(G) proven later.

Algorithm 2 employed quantities $E_0$ and $E_{max}$, which are defined in the listing of the algorithm. However, briefly here, $E_{max}$ is roughly an upper bound on the eigenvalues of H(G) and $E_0$ may be the largest eigenvalue of $H(\lambda v \mathbb{E}^p)$. Algorithm 2 enables detection by verifying that the largest eigenvalue is significantly larger than $E_{max}$, which occurs when $E_0$ is large enough. Indeed, it is shown below that it suffices to have $E_0 = (1+c)E_{max}$ for any fixed $c > 0$. This fixes the scaling of $n_{bos}$ with $\lambda$ so that (up to polylogarithmic factors) $n_{bos} \geq (n^{-p/4}/\lambda)^{4/(p-2)}$ can be employed.

One interesting feature of algorithm 2 is that in step 3, the density matrix of the leading eigenvector or of any vector in the eigenspace of eigenvalue $\geq E_{cut}$ is computed, for $E_{cut} \equiv (E_0 + E_{max})/2$ defined in the algorithm. This might seem surprising, given that the leading eigenvector is computed in step 1; one might wonder why some other vector should be taken. Algorithm 2 is described in this way since, in classical and quantum embodiments, which are discussed below, compute the spectral properties of the matrix. In some of these embodiments, the leading eigenvector may not be extracted, but instead some vector in this eigenspace, is extracted, due to use of the power method in a classical algorithm or due to approximations in phase estimation in a quantum algorithm. Thus, much of the below analysis is given to show that some eigenvalue, which is larger than $E_{cut}$, exists by lower bounding the leading eigenvalue $\lambda_1$.

---
Algorithm 2 Spectral algorithm.

This algorithm takes a tensor $T_0$ as input and also a scalar $\overline{\lambda}$ and an integer $n_{bos}$. The output is a decision about whether $\lambda = \overline{\lambda}$ or $\lambda = 0$, and, if the algorithm reports that $\lambda = \overline{\lambda}$, it also returns an approximation of $v_{sig}$ (up to an overall sign). The quantity $n_{bos}$ is chosen depending upon the value of $\overline{\lambda}$; smaller values of $\overline{\lambda}$ require larger values of $n_{bos}$ in order for $E_0$ to be sufficiently larger than $E_{max}$ for the algorithm to be accurate. See theorems 2, 4, 3, 5. For $E_0 \geq (1 + c)E_{max}$ for any $c > 0$, the algorithm achieves recovery.

1. Compute the eigenvector of $H(T_0)$ and the leading eigenvalue, denoted $\lambda_1$.
2. (Detection) If
$$\lambda_1 > E_{cut} \equiv E_0 + E_{max}/2,$$
where $E_0 = \overline{\lambda}\binom{n_{bos}}{p/2}N^{p/2}$ for even $p$ and $E_0 = \overline{\lambda}^2(p-1)!\binom{n_{bos}}{p-1}N^p$ for odd $p$, and where $E_{max}$ is defined in theorem 1, then report that $\lambda = \overline{\lambda}$. Otherwise report $\lambda = 0$.
3. (Recovery) Compute the single particle density matrix (defined below) of the leading eigenvector or of any vector in the eigenspace of eigenvalue $\geq E_{cut}$. Apply algorithm 1 to recover an approximation to $v_{sig}$.
---

In section "Spectrum of Random Hamiltonian", the largest eigenvalue $\lambda_1$ of H(G) is considered. The following theorem summarizes the results of lemma 5 and lemma 7.

Briefly, the result for odd p may be given by considering the result for even $p' = 2(p-1)$ and then multiplying the largest eigenvalue by a factor of $\sqrt{N}$.

Theorem 1 Let $\lambda_1$ be the largest eigenvalue of G. For even p let $$E_{max} = \sqrt{2J\log(N)} n_{bos}^{p/4+1/2} N^{p/4},$$

and for odd $p$ let $$E_{max} = 2\sqrt{J\log(N)} n_{bos}^{p/2} N^{p/2},$$

where J is a scalar depends that implicitly on p, $n_{bos}$, N and tends to some function depending only on p for large $n_{bos}$, N. More precisely, for even p, J is equal to $(p/2)!_{p-1}^{(n_{bos})}/n_{bos}^{p/2} + o(1)$ for the real ensemble and is twice that for the complex ensemble, and for odd p, J is equal to that for the even case for 2(p-1).

Then, for any x, $$Pr[\lambda_1 \geq x] \leq \exp\left(-\frac{x - E_{max}}{\xi}\right), \quad (10)$$

with for even p $$\xi = \frac{\sqrt{J} n_{bos}^{p/4-1/2} N^{p/4}}{\sqrt{2\log(N)}} \quad (11)$$

and for odd p $$\xi = \frac{\sqrt{J} n_{bos}^{p/2-1} N^{p/2}}{\sqrt{\log(N)}}. \quad (12)$$

So, for any E' which is $\omega(\xi)$, with high probability $\lambda_1 \leq E_{max} + E'$.

Now consider the eigenvectors and eigenvalues of $H(T_0)$. For any symmetric tensor T of order $n_{bos}$, let $|T\rangle$, the vector on $n_{bos}$ qudits (each of dimension N) with amplitudes given by the entries of the tensor. This vector is only normalized if $|T| = 1$. So, $\Psi_{sig} \equiv N^{-n_{bos}/2} |v_{sig}\rangle^{\otimes n_{bos}}$, is a normalized vector.

Lemma 2 may be relied upon throughout.

Lemma 2. Let $\lambda_1$ be the largest eigenvalues of $H(T_0)$. Then, $\lambda_1 \geq E \equiv \langle \Psi_{sig} | H(T) | \Psi_{sig} \rangle$.

Proof. Immediate from the variational principle.

Even p Case

The correctness of algorithm 2 is discussed below. All results in this subsubsection refer to even p even if if not stated explicitly. First E of lemma 2 is estimated to show detection. Then, recovery is shown.

The below equations may be relied upon throughout the discussion.

$$E = \langle \Psi_{sig} | H(\lambda v_{sig}^{\otimes p}) | \Psi_{sig} \rangle + \langle \Psi_{sig} | H(G) | \Psi_{sig} \rangle \quad (13)$$

$$= E_0 + \langle \Psi_{sig} | H(G) | \Psi_{sig} \rangle, \quad (14)$$

where $$E_0 = \lambda (p/2)!_{p/2}^{(n_{bos})} N^{p/2}. \quad (15)$$

To evaluate $\langle \Psi_{sig} | H(G) | \Psi_{sig} \rangle$ it may be convenient to exploit a rotational invariance of this problem. Such a rotation may be applied using any matrix O in the orthogonal group O(N), rotating the creation and annihilation operators by $a_\mu^\dagger \to \Sigma_\nu O_{\mu\nu} a_\nu^\dagger, a_\mu \to \Sigma_\nu O_{\mu\nu} a_\nu$, and similarly for the annihilation operators. This rotation preserves the canonical commutation relations. The basis states of the full Hilbert space of Eq. (5) are rotated by rotating the basis states on each qudit by O. The tensors in H(G) may be rotated by multiplying each leg of the tensor by a rotation matrix. This rotation preserves the Gaussian measure. The rotation may be applied such that $v_{sig}$ is some fixed vector, e.g., $(\sqrt{N}, 0, 0, \ldots )$. Then $\langle \Psi_{sig}|H(G)|\Psi_{sig}\rangle$ may be equal to $(p/2)!_{p/2}^{(n_{bos})}$ multiplied by a single entry of G, i.e., the entries with all indices equal to 1, which is some quantity chosen from a Gaussian distribution with zero mean and unit variance. So, with high probability, $E=\lambda(p/2)!_{p/2}^{(n_{bos})} N^{p/2}+n_{bos}^{p/2}O(N^\eta)$ for any $\eta>0$.

Theorem 2 may be relied upon throughout.
Theorem 2. If $$\lambda(p/2)!_{p/2}^{(n_{bos})}N^{p/2} - E_{max} = \omega\left(\frac{\sqrt{J}\, n_{bos}^{p/4-1/2}N^{p/4}}{\sqrt{2\log(N)}}\right),$$

then with high probability algorithm 2 correctly determines whether $\lambda=0$ or $\lambda=\bar{\lambda}$.
Proof. This follows from the estimate of E which lowers bounds the largest eigenvalue when $\lambda=\bar{\lambda}$ and from theorem 1 which upper bounds $\|H(G)\|$.

Given any state, the single particle density matrix $\rho_1$ may be defined in the basis for the full Hilbert space used in Eq. (5). The single particle density matrix may be employed as the reduced density matrix on any of the qudits. Equivalently, this single particle density matrix may be expressed in terms of creation and annihilation operators by $$(\rho_1)_{\mu\nu} = \frac{1}{n_{bos}} a_\mu^\dagger a_\nu. \quad (16)$$

In the above equation, $\rho_1$ may be positive semi-definite, Hermitian, and trace 1. Theorem 3 may be relied upon throughout.
Theorem 3. Given any vector $\Psi$ such that $\langle\Psi|H(T_0)|\Psi\rangle \geq (1+c)E_{max}$ for any scalar $c>0$, then with high probability the corresponding single particle density matrix $\rho_1$ obeys $$\frac{\langle v_{sig}|\rho_1|v_{sig}\rangle}{N} \geq (c-o(1))\frac{E_{max}}{E_0}. \quad (17)$$

In particular, for $\langle\Psi|H(T_0)|\Psi\rangle \geq E_{cut}$ with $E_{max}>(1+c')E_0$ we have $c>c'/2$ so with high probability $$\frac{\langle v_{sig}|\rho_1|v_{sig}\rangle}{N} \geq \frac{1}{2}\frac{c'}{1+c'}. \quad (18)$$

Hence, algorithm 2 achieves recovery.
Proof. We have $\langle\Psi|H(\lambda v_{sig}^{\otimes p})|\Psi\rangle +\langle\Psi|H(G)|\Psi\rangle \geq (1+c)E_{max}$. By theorem 1), with high probability $\langle\Psi|H(G)|\Psi\rangle \leq (1+O(1))E_{max}$. Hence, $\langle\Psi|H(\lambda v_{sig}^{\otimes p})|\Psi\rangle \geq (c-o(1))E_{max}$.

Rotate so that $v_{sig}=(\sqrt{N}, 0, 0, \ldots )$. The Hamiltonian $H(\lambda v_{sig}^{\otimes p})$ is diagonal in the computational basis for the full Hilbert space, and given a basis state with m out of $n_{bos}$ of the qudits in state $|1\rangle$, we have $H(\lambda v_{sig}^{\otimes p})$ equal to $\lambda(p/2)!_{p/2}^{(m)}$. Hence, since $_{p/2}^{(m)}m$ is an increasing function of m, Eq. (17) follows.

In general, the same (or similar) result may hold for any mixed state. That is, given any mixed state $\sigma$ such that $tr(\sigma H(T_0))\geq(1+c)E_{max}$ for any scalar $c>0$, then with high probability the corresponding single particle density matrix $\rho_1$ may obey Eq. (17).

Odd p Case
The correctness of the algorithm 2 for odd p is demonstrated below. All results in this subsubsection refer to odd p even if we do not state it explicitly.

To show detection, via algorithm 2, E may be estimated as shown below. E may be written as $E=\langle\Psi_{sig}|H(T_0)|\Psi_{sig}\rangle$, but now $H(T_0)$ is a quadratic function of $T_0$ so there are some cross-terms. The definition in equation 19 may be employed to evaluate at least some of the cross terms.

$$\langle\Psi_{sig}|H(v_{sig}^{\otimes p})|\Psi_{sig}\rangle =\lambda^2(p-1)!_{p-1}^{(n_{bos})}N^p\equiv E_0. \quad (19)$$

A cross-term may be evaluated as:

$$\langle\Psi_{sig}|\sum_{\mu_1,\ldots,\mu_{p-1}}\sum_{v_1,\ldots,v_{p-1}}\sum_\sigma (v_{sig}^{\otimes}p)_{\mu_1,\mu_2,\ldots,\mu_{p-1},\sigma}$$

$$G_{v_1,v_2,\ldots,v_{p-1},\sigma}\left(\prod_{i=1}^{(p-1)/2} a_{\mu_i}^\dagger a_{v_i}^\dagger\right)\left(\prod_{i=(p-1)/2+1}^{p-1} a_{\mu_i}a_{v_i}\right) + h.c.|\Psi_{sig}\rangle.$$

The same, or similar, rotational invariance as in the even p case may be exploited, and this may be equal to $2_{p-1}^{(n_{bos})}$ multiplied by the real part of a single entry of G, i.e., the entry with all indices equal to 1. So, with high probability, this cross-term is bounded by $n_{bos}^{p-1}O(N^\eta)$ for any $\eta>0$.

The term quadratic in G may be evaluated as:

$$\frac{1}{2}\langle\Psi_{sig}|\sum_{\mu_1,\ldots,\mu_{p-1}}\sum_{v_1,\ldots,v_{p-1}}\sum_\sigma G_{\mu_1,\mu_2,\ldots,\mu_{p-1},\sigma}$$

$$G_{v_1,v_2,\ldots,v_{p-1},\sigma}\left(\prod_{i=1}^{(p-1)/2} a_{\mu_i}^\dagger a_{v_i}^\dagger\right)\left(\prod_{i=(p-1)/2+1}^{p-1} a_{\mu_i}a_{v_i}\right)+h.c.|\Psi_{sig}\rangle.$$

Exploiting the same rotational invariance as before, fixing $v_{sig}=(\sqrt{N}, 0, 0, \ldots )$, $\mu_i$, $v_i=1$ may apply in some embodiments. This may be a sum of squares of N different entries of G, and corresponding to N possible choices of $\sigma$. If the complex ensemble is employed, then this has vanishing mean. So, with high probability this term is $n_{bos}^{p-1}O(N^\eta)$ for any $\eta>1/2$.

Hence,
Theorem 4 If $$\lambda^2(p-1)!_{p-1}^{(n_{bos})} N^p - E_{max} = \omega\left(\frac{\sqrt{J}\,n_{bos}^{p/2-1}N^{p/2}}{\sqrt{\log(N)}}\right),$$

then with high probability algorithm 23 correctly determines whether $\lambda=0$ or $\lambda=\bar{\lambda}$.
Proof. This follows from the estimate of E which lowers bounds the largest eigenvalue when $\lambda=\bar{\lambda}$ and from theorem 1 which upper bounds $\|H(G)\|$. For $\lambda=N^{-p/4}$, we have that $$\lambda n_{bos}^{p-1}O\left(N^{(3p-1)/4} = n_{bos}^{p-1}O(N^{p/2-1/4})\right) = o\left(\left(\frac{\sqrt{J}\,n_{bos}^{p/2-1}N^{p/2}}{\sqrt{\log(N)}}\right)\right).$$

Indeed, we may take $\lambda$ polynomially smaller than $N^{-p/4}$ and the cross terms are still negligible.

Recovery may now be considered. A more general bound on cross terms, which may be useful, is provided below. The following expression may be applicable in some embodiments:

$$H(T_0) = H(\lambda v_{sig}^{\otimes p}) + H(G) + \text{cross terms}.$$

Considering bounding the cross terms by application of lemma 3.

Lemma 3. With high probability, the operator norm of the cross terms is bounded by $\lambda N^{p/2} O(N^{(p-1)/4}) n_{bos}^{p-1}$.

Proof. The cross-terms are equal to $2H(T_{cross})$ where $T_{cross}$ is a tensor for even $q=2(p-1)$ which has components $$(T_{cross})_{\mu_1,\ldots,\mu_{(p-1)/2},v_1,\ldots,v_{(p-1)/2},\mu_{(p-1)/2+1},\ldots,\mu_p,v_{(p-1)/2},\ldots,v_p} = \quad (20)$$

$$\lambda \sum_{\sigma} T_{\mu_1,\ldots,\mu_{p-1},\sigma}(v_{sig})_{v_1} \ldots (v_{sig})_{v_{p-1}} (v_{sig})_{\sigma}.$$

Rotating so that $v_{sig} = (\sqrt{N}, 0, 0, \ldots)$, we have $$(T_{cross})_{\mu_1,\ldots,\mu_{(p-1)/2},v_1,\ldots,v_{(p-1)/2},\mu_{(p-1)/2+1},\ldots,\mu_p,v_{(p-1)/2},\ldots,v_p} = \quad (21)$$

$$\lambda N^{(p-1)/2} \sum_{\sigma} T_{\mu_1,\ldots,\mu_{p-1},1} \prod_{i=1}^{p-1} \delta_{v_i,1}.$$

Clearly, $\|H(T_{cross})\| \leq n_{bos}^{p-1} \|M_{cross}\|$, where $M_{cross}$ is an $N^{p-1}$-by-$N^{p-1}$ matrix, whose entries are determined by the entries of $T_{cross}$ in an obvious way so that the first $p-1$ indices of $T_{cross}$ determine a column index in $M$ and the last $p-1$ indices of $T_{cross}$ determine a row index of $M$. Regard $T_{\mu_1,\ldots,\mu_{p-1},1}$ as a tensor of order $p-1$ and let $M'$ by the $N^{(p-1)/2}$-by-$N^{(p-1)/2}$ matrix whose entries are determined by the entries of this tensor $T_{\mu_1,\ldots,\mu_{p-1},1}$, again in the obvious way so that the first $(p-1)/2$ indices of the tensor determine a column index and the last $(p-1)/2$ indices determine a row index.

Then, $$\|M_{cross}\| = \lambda N^{p/2} \|M'\|. \quad (22)$$

However, since the entries of $M'$ are independent Gaussian random variables, from standard random matrix theory results, with high probability $\|M'\| = O(N^{(p-1)/4})$. Remark: the dependence on $n_{bos}$ is not tight here.

Similar to the even case, theorem 5 may be applicable.

Theorem 5 Given any vector $\Psi$ such that $\langle \Psi | H(T_0) | \Psi \rangle \geq (1+c)E_{max}$ for any scalar $c>0$, then with high probability the corresponding single particle density matrix pi obeys $$\frac{\langle v_{sig} | \rho_1 | v_{sig} \rangle}{N} \geq (c - o(1)) \frac{E_{max}}{E_0}. \quad (23)$$

In particular, for $\langle | H(T_0) | \Psi \rangle \geq E_{cut}$ with $E_{max} > (1+c')E_0$ we have $c > c'/2$ so with high probability $$\frac{\langle v_{sig} | \rho_1 | v_{sig} \rangle}{N} \geq \frac{1}{2} \frac{c'}{1+c'}. \quad (24)$$

Hence, algorithm 2 achieves recovery.

Proof. We use lemma 3 to bound $\|H(T_{cross})\|$. This bound is asymptotically negligible compared to $E_{max}$. So, We have $\langle | H(\lambda v_{sig}^{\otimes p} | \Psi \rangle + \langle \Psi | H(G) | \Psi \rangle \geq (1+c-o(1))E_{max}$ where the $o(1)$ denotes the $o(1)$ contribution from the cross terms.

Then, the rest of the proof is the same as in the even case, except for a replacement of $p/2$ by $p-1$. In detail: by theorem 1), with high probability $\langle \Psi | H(G) | \Psi \rangle \leq (1+o(1))E_{max}$. Hence, $\langle \Psi | H(\lambda v_{sig}^{\otimes p} | \Psi \rangle \geq (c-o(1))E_{max}$.

Rotate so that $v_{sig} = (\sqrt{N}, 0, 0, \ldots)$. The Hamiltonian $H(\lambda v_{sig}^{\otimes p})$ is diagonal in the computational basis for the full Hilbert space, and given a basis state with m out of $n_{bos}$ of the qudits in state $|1\rangle$, we have $H(\lambda v_{sig}^{\otimes p})$ equal to $\lambda(p/2)!_{p-1}^{(m)}$. Hence, since $_{p-1}^{(m)}/m$ is an increasing function of m, Eq. (17) follows.

Spectrum of Random Hamiltonian

In this section, the eigenvalues of $H(G)$ are estimated. First the case of even p is considered. Then, the case of odd p is considered by reducing it to the case of even p.

Even p

The case of even p is considered in this subsection. Let $Z(\tau, p, N, n_{bos})$ denote $\mathbb{E}[tr(\exp(\tau H(G)))]$ for a tensor G of rank p, with entries of G chosen from the Gaussian distribution, with given $N, n_{bos}$. In this subsection, G may be symmetrized or not, and may be chosen from either the real or complex ensemble.

The main result in this section is lemma 4.

Lemma 4. For each ensemble, real or complex, symmetrized or not, we have $$Z(\tau, p, N, n_{bos}) \leq D(N, n_{bos}) \exp\left(\tau^2 (J/2) n_{bos}^{\frac{p}{2}} N^{\frac{p}{2}}\right), \quad (25)$$

where J is a scalar depends that implicitly on p, $n_{bos}$, N and tends to some function depending only on p for large $n_{bos}$, N. More precisely, J is equal to $(p/2)!_{p/2}^{(n_{bos})}/n_{bos}^{p/2} + o(1)$ for the real ensemble and is twice that for the complex ensemble.

Proof. We first give a brief derivation of Eq. (27) below which is a standard result using quantum field theory techniques. Note that $\tau H(G) = H(\tau G)$ and $\tau G$ is a tensor with entries chosen from a Gaussian distribution with zero mean and variance $\tau^2$. Hence for any $\tau' > \tau$ we have $$Z(\tau', p, N, n_{bos}) = \mathbb{E}_G \mathbb{E}_\eta [tr(H(\tau G + \eta))], \quad (26)$$

where $\mathbb{E}_G[\ldots]$ denotes the expectation value over G and $\mathbb{E}_\eta$ denotes the expectation value over a tensor $\eta$ with Gaussian entries with zero mean and variance $(\tau')^2 - \tau^2$. Taking the expectation value over $\eta$, for $\tau'^2 - \tau^2$ small, we need to keep only the zero and second order terms on the right-hand side. So, we find that $$\partial_\tau^2 Z(\tau, p, N, n_{bos}) = \int_0^1 ds_1 \int_0^{s_1} ds_2 \quad (27)$$

$$\mathbb{E}_{G,\eta}[tr(\exp(1-s_2)\tau H(G) H(\eta) \exp((s_2 - s_1)\tau H(G)) H(\eta) \exp(s_1 \tau H(G)))].$$

Using cyclic properties of the trace, this can be simplified to $$\partial_\tau^2 Z(\tau, p, N, n_{bos}) = \quad (28)$$

$$\frac{1}{2} \int_0^1 ds_1 \mathbb{E}_{G,\eta}[tr(\exp((1-s_1)\tau H(G)) H(\eta) \exp(s_1 \tau H(G)) H(\eta))].$$

We now use a general result. Consider any Hermitian H (we will use $H = H(G)$) and any operator O (we will use $O=H(\eta)=H(\eta)\dagger$ and any $s_1 \in [0,1]$. We claim that $tr(exp(H)O\dagger O+O \leftrightarrow O\dagger) \geq tr(exp((1-s_1)H)O\dagger exp(s_1 H)O)+O \leftrightarrow O\dagger$, where $O \leftrightarrow O\dagger$ indicates the previous term with $O, O\dagger$ interchanged. Proof of claim: work in an eigenbasis of H. It suffices to consider the case that $O=|b\rangle\langle a|$ where $|a\rangle$, $|b\rangle$ are eigenvectors of H with eigenvalues $E_a$, $E_b$. Then the the right-hand side is equal to $exp(s_1 E_a+(1-s_1)E_b)+exp(s_1 E_b+(1-s_1)E_a)=2 \ exp((E_a+E_b)/2)cosh((s_1-1/2)(E_b-E_a))$. The cosh function is maximized on the interval [0,1] at $s_1=0,1$ when the right-hand side becomes equal to the left-hand side. So, $$\partial_\tau^2 Z(\tau, p, N, n_{bos}) \leq \frac{1}{2} \mathbb{E}_{G,\eta}[tr(exp(\tau H(G))H(\eta)^2)]. \quad (29)$$

For the real ensemble without symmetrization, we have $\mathbb{E}[H(\eta)^2] = (\Sigma_{\mu_1, \ldots, \mu_{p/2}} \Sigma_{v_1, \ldots, v_{p/2}} \Pi_{i=1}^{p/2} (a_{\mu_i}\dagger a_{v_i}) \Pi_{i=1}^{p/2} (a_{v_i}\dagger a_{\mu_i})$. To leading order in N, we may approximate $\Sigma_v a_v a_v\dagger = N$ so on the given Hilbert space, $\mathbb{E}[H(\eta)^2]$ is a scalar equal to $(p/2)!_{p/2}^{(n_{bos})} N^{p/2}+O(N^{p/2-1})$. In general, for the complex or real ensemble, symmetrized or not, we find that $\mathbb{E}[H(\eta)^2]$ is a scalar equal to $J(p/2)!_{p/2}^{(n_{bos})} N^{p/2}$, where J obeys the claims of the lemma. Hence, from Eq. (29), $\partial_\tau^2 log(Z(\tau, p, N, n_{bos}) \leq (J/2) n_{bos}^{p/2} N^{p/2}$.

Remark: this result may not be tight in the regime where random matrix theory is accurate ($n_{bos}=p/2$). The correlation function $\mathbb{E}_{G,\eta}[tr(exp((1-s_1)\tau H(G))H(\eta)exp(s_1 \tau H(G))H(\eta))]$ may not be independent of $s_1$, but rather may decay as a function of $s_1$ for $s_1 \leq \tau/2$ (of course, it increases again as $s_1$ becomes larger than $\tau/2$). Considering the regime $s_1 \ll \tau/2$, using the square-root singularity at the edge of the Wigner semi-circle we can estimate that it decays as $s_1^{-3/2}$. This means that the integral of this correlation function over $s_1$ may be dominated by its value for small $s_1$ so that for $\tau$ large compared to the inverse width of the semi-circle (though of course $\tau$ not too large) the integral becomes roughly independent of $\tau$. This is stronger from the upper bounds here where we have bounded by the integral by something proportional to $\tau$. A tighter analysis may show that a similar effect will happen in the case of $n_{bos} \gg p/2$; however, an important effect happens. If an eigenstate of H(G) with some eigenvector $\lambda_0$ is taken, and $H(\eta)$ is applied for random $\eta$, this only changes $p/2$ out of the $n_{bos}$ qudits in the state. The resulting state may have an expectation value of H(G) that is $\lambda(1-p/(2n_{bos}))$ rather than an (as in the random matrix case) expectation value of H(G) which is zero. Accordingly, the correlation function may be non-negligible for $s_1 \lesssim n_{bos}/p$. A heuristic estimate in this fashion may indicate that the lemma below for the eigenvalue is tight up to logarithmic factors.

From lemma 4, lemma 5 is an immediate corollary:
Lemma 5. Let $\lambda_1$ be the largest eigenvalue of G. Let
$E_{max} = \sqrt{2J log(N)} n_{bos}^{p/4+1/2} N^{p/4}$.
Then, for any x, $$Pr[\lambda_1 \geq x] \leq exp\left(-\frac{x-\mathbb{E}_{max}}{\xi}\right), \quad (30)$$

with $$\xi = \frac{\sqrt{J} n_{bos}^{p/4-1/2} N^{p/4}}{\sqrt{2 log(N)}} \quad (31)$$

So, for any E' which is $\omega(\xi)$, with high probability $\lambda_1 \leq E_{max}+E'$.
Proof. We have $tr(exp(\tau H(G)) \geq exp(\tau \lambda_1)$. Hence, for any x, $Pr[\lambda_1 \geq x] \leq Z(\tau, p, N, n_{bos})/exp(\tau x)$. Since $D(N, n_{bos}) \leq N^{n_{bos}}$, minimizing over $\tau$, we find that $$Pr[\lambda_1 \geq x] \leq exp\left(n_{bos} log(N) - \frac{x^2}{2 J n_{bos}^{p/2} N^{p/2}}\right).$$

For $x=E_{max}$, the right-hand is equal to 1 and for $x > E_{max}$ the right-hand side decays exponentially.

Odd p

The case of odd p is considered in this subsection. Let $Z(\tau, p, N, n_{bos})$ denote $\mathbb{E}[tr(exp(\tau H(G)))]$ for a tensor G of rank p, with entries of G chosen from the Gaussian distribution, with given N, $n_{bos}$. In this subsection, G is complex and not symmetrized. The Hamiltonian H(G) is given by Eq. (6) for even p and by Eq. (9) for odd p.

The calculation for odd p may be reduced to the case for even p, up to a bounded error, via lemma 6.
Lemma 6. For odd p, for $n_{bos}^p \tau N^{1/3} = o(1)$, $$Z(\sqrt{2N}\tau, 2(p-1), N, n_{bos}) \leq Z(\tau, p, N, n_{bos}) \leq Z(\sqrt{2N}\tau, 2(p-1), N, n_{bos}) exp(o(N^{(p-1)/2})) \quad (32)$$

Remark: the assumptions require that $\tau$ is o(1); however, that is still large enough $\tau$ to be useful later in bounding the spectrum since the eigenvalues of H(G) are typically large.
Proof. For arbitrary H(G), the exponential $exp(\tau(H(G)))$ can be expanded as a series $$1 + \tau H(G) + \frac{\tau^2}{2} H(G)^2 + \ldots .$$

We bring the expectation value (over G) inside the trace, and compute the expectation value of this series. This expectation value can be computed using Wick's theorem to compute the expectation value of a moment of a Gaussian distribution.

For odd p, each term in H is a sum of two terms, one depending on the product of two tensors G and one depending on the product of two tensors $\overline{G}$, where the overline denotes complex conjugation. Hence, the m-th order term $$\frac{\tau^m}{m!} H(G)^m$$

is a sum of $2^m$ terms, corresponding to m different choices of G or $\overline{G}$ in each H(G)); we call each such choice a history. Each term is a product of creation and annihilation operators depending on a product of 2m tensors, some of which are G and some of which are $\overline{G}$. This expectation value of such a term is non-vanishing only if there are m tensors G and m tensors $\overline{G}$. In that case, the expectation value is given by summing over ways of pairing each tensor G with a distinct tensor $\overline{G}$. There are m! such pairings. Then, for each such pairing, one computes an operator by taking the operator $$\frac{\tau^m}{m!} H(G)^m$$

and replacing, for every pair, the two tensors $G_{\mu_1, \ldots, \mu_p}$, $G_{v_1, \ldots, v_p}$, in that pair with a product of $\delta$-functions $$\prod_{a=1}^{p}\delta_{\mu_a,\nu_a} = \mathbb{E}[G_{\mu_1,\ldots,\mu_p}\overline{G}_{\nu_1,\ldots,\nu_p}].$$

Summing this operator over pairings gives the expectation value.

Note also that here we have not symmetrized G. If we were to symmetrize G, then $\mathbb{E}[G_{\mu_1},\ldots,_{\mu_p}\overline{G}_{\nu_1},\ldots,_{\nu_p}]$ is given by 1/p! times a sum of p! different products of δ-functions, i.e. $\Sigma_\pi \delta_{\mu_a,\nu_{\pi(a)}}$, where π is a permutation. This would lead to additional terms that we need to compute and would make the analysis more difficult (though in practice may lead to better performance).

For given m, given history and given pairing, let us define a cluster as follows: define a graph with 2m vertices, each vertex corresponding to a single tensor, either G or $\overline{G}$. Let there be an edge between any two tensors which both appear in the same term in the Hamiltonian. Let there also be an edge between any two tensors which are in a pair. Hence, this is a graph of degree 2 (we allow the possibility of multiple edges connecting two vertices if we pair two tensor which both appear in the same term in the Hamiltonian). A cluster is a connected component of this graph.

We refer to a cluster containing four vertices as a minimal cluster. A cluster with six or more vertices is called a non-minimal cluster. Note that there are no clusters containing only two terms because each term in H(G) depends on a product of two tensors G or two tensors $\overline{G}$; if we had not taken the complex ensemble and instead taken G to be real, we would instead have these clusters with two terms. We discuss the case of the real ensemble further after the proof of the lemma.

The minimal clusters will turn out to give the dominant order contribution in an expansion in N. The non-minimal clusters will be sub-leading order.

We have expressed $$\frac{\tau^m}{m!}H(G)^m$$

as a sum over histories and pairings and so $\mathbb{E}[\exp(\tau H(G))]$ is a sum over m, histories, and pairings, and so $Z(\tau, p, N, n_{bos})$ is also given by a sum over m, histories, and pairings as one may take the trace of each term in $\mathbb{E}[\exp(\tau H(G))]$. Note that each m, history, and pairing gives a non-negative contribution to $Z(\tau, p, N, n_{bos})$.

Lower Bound—Now we prove the first inequality in Eq. (32), namely that $Z(\sqrt{2N}\tau, 2(p-1), N, n_{bos}) \leq Z(\tau, p, N, n_{bos})$. To do this, we first define a similar summation over m, histories, and pairings to compute $Z(\tau, q, N, n_{bos})$ for even q=2(p−1) and then we compare the two summations.

For even q, each term in H is a sum of two terms, one depending linearly on a tensor G and one depending on tensor $\overline{G}$. As before, the m-th order term $$\frac{\tau^m}{m!}H(G)^m$$

is a sum of $2^m$ histories, corresponding to m different choices of G or $\overline{G}$ in each H(G)). Each term is a product of creation and annihilation operators depending on a product of m tensors, some of which are G and some of which are $\overline{G}$; note the difference here from the odd case where there are only m tensors, rather than 2m. This expectation value of such a term is non-vanishing only if there are m/2 tensors G and m/2 tensors $\overline{G}$. In that case, expectation value is given as before by summing over pairings and replacing the two tensors in the pair with δ-functions.

We observe then that if we consider $Z(\tau, p, N, n_{bos})$ for odd p and consider only the sum of pairings for which all clusters are minimal, this gives precisely the sum of terms for $Z(\sqrt{2N}\tau, 2(p-1), N, n_{bos})$. To show this, let $L_{2(p-1)}$ label a given choice of m, history, and pairing for $Z(\sqrt{2N}\tau, 2(p-1), N, n_{bos})$ and let $L_p$ label a given choice of m, history, and clusters for $Z(\tau, p, N, n_{bos})$ for which all clusters are minimal. There are $2^{m/2}$ different pairings for the given choice of clusters labelled by $L_p$.

We will construct a one-to-one correspondence between $L_p$ and $L_{2(p-1)}$ and show that the sum of the values of terms labeled by $L_p$ is equal to the value of the term labeled by $L_{2(p-1)}$. Consider given $L_p$. Then, $L_{2(p-1)}$ is as follows. The value of m is the same. The history is also the same: for a given sequence of choices of G or $\overline{G}$ for $L_p$, we use the same sequence for $L_{2(p-1)}$. The pairing is as follows. We introduce notation to label the tensors in $H(G)^m$. For even p, we label the tensors by an integer $i \in \{1, 2, \ldots, m\}$ depending which of the m factors of H(G) it is in. Here, we mean that the tensors appear in the product $H(G)^m = H(G) \cdot H(G) \cdot \ldots \cdot H(G)$; we label each of the different factors in the product 1, 2, ..., m in sequence. For odd p, we label the tensors by a pair (i, w) for $i \in \{1, 2, \ldots, m\}$ and $w \in \{1, 2\}$. The integer i labels which of the m factors of H(G) it is in and w labels whether it is the first or second of the two tensors in H(G). For a pairing for $Z(\tau, p, N, n_{bos})$ with all clusters minimal, then each cluster is of the form that for some i,j that we pair (i, 1) with (j, 1) and (i, 2) with (j, 2) or of the form that we pair (i, 1) with (j, 2) and (i, 2) with (j, 1). For a given choice of clusters, the corresponding pairing for $L_{2(p-1)}$ pairs i with j. We sketch the claim about the value of the terms. For each cluster we have four two tensors T and two tensors $\overline{T}$. One is computing the expectation value $$\mathbb{E}\left[\sum_{\mu_1,\ldots,\mu_{p-1}}\sum_{\nu_1,\ldots,\nu_{p-1}}\sum_\sigma T_{\mu_1,\mu_2,\ldots,\mu_{p-1},\sigma}\overline{T}_{\nu_1,\nu_2,\ldots,\nu_{p-1},\sigma}\right.$$
$$\left.\sum_{\alpha_1,\ldots,\alpha_{p-1}}\sum_{\beta_1,\ldots,\beta_{p-1}}\sum_\sigma T_{\alpha_1,\alpha_2,\ldots,\alpha_{p-1},\sigma}\overline{T}_{\beta_1,\beta_2,\ldots,\beta_{p-1},\sigma}\right],$$

which is equal to some product of δ-function. This expectation value then multiplies the operators $(\Pi_{i=1}^{(p-1)/2} a_{\mu_i}^\dagger a_{\mu_i})$ $(\Pi_{i=(p-1)/2+1}^{p-1} a_{\mu_i} a_{\nu_i})$ and $(\Pi_{i=1}^{(p-1)/2} a_{\alpha_i}^\dagger a_{\alpha_i})(\Pi_{i=(p-1)/2+1}^{p-1} a_{\alpha_i} a_{\beta_i})$ inserted at the appropriate places into the product $H(G)^m$. The δ-functions constrain $\sigma = \sqrt{\sigma}$; summing over this gives a factor of N for each cluster, while there are two pairings for each cluster giving another factor of 2 for each cluster. The number of clusters is equal to m/2, giving a factor $(2N)^{m/2}$.

This proves the first inequality.

Upper bound—Now we prove the second inequality in Eq. (32). To do this, we define the following quantity for q which is a multiple of 4 (note that q=2(p−1) is a multiple of 4 if p is odd):

$$Z'(\tau,\tau',q,N,n_{bos}) = \mathbb{E}[tr(\exp(\tau H(G)+\tau' H'(G')^2)], \quad (33)$$

where the expectation value is over tensors G of order q chosen from the complex ensemble and tensors G' of order q/2 chosen also from the complex ensemble (note that q/2 is even). Note that we square H'(G') in the exponent.

We will prove that $$Z(\tau,p,N,n_{bos}) \leq Z'(\sqrt{2N}\tau,\tau',2(p-1),N,n_{bos}) \quad (34)$$

for $\tau' = N^{1/3}\tau$. From this, the second inequality in Eq. (32) follows. To see this, we have, for any G', $\|H'(G')^2\| \leq O(n_{bos}{}^p) \|G'\|^2$ where the operator norm $\|H'(G')^2\|$ denotes the largest eigenvalue in absolute value and $\|G'\|$ denotes the largest singular value of G', regarding G' as a matrix of size $N^{q/4}$-by-$N^{q/4}$. So, $$\mathbb{E}_G[tr(\exp(\tau H(G) + \tau' H'(G')^2))] \leq \mathbb{E}_G[tr(\exp \tau H(G))]$$
$$\mathbb{E}_{G'}[\exp(O(n_{bos}{}^p)\tau'\|G'\|^2)] = Z($$
$$\sqrt{2N}\tau, 2(p-1), N, n_{bos})\mathbb{E}_{G'}[\exp(O(n_{bos}{}^p)\tau'\|G'\|^2)]. \quad (35)$$

where the subscript G or G' denotes the expectation over G or G'. The matrix G' has complex entries; we can bound its operator norm by the sum of the operator norms of its Hermitian and anti-Hermitian parts. For $n_{bos}{}^p/\tau' = o(1)$, we have $\mathbb{E}_{G'}[\exp(O(n_{bos}{}^p)\tau'\|G'\|^2)] = \exp[O(n_{bos}{}^p)\tau'O(N^{q/4})]$ as can be shown using Hermite polynomials to compute the probability distribution of the eigenvalues of a random matrix and using the decay of a Hermite matrix multiplying a Gaussian (the study of the largest eigenvalue of a random matrix is a rich field if we consider the probability distribution near the edge of the Wigner semi-circle but here we are satisfied to consider the probability distribution for eigenvalues which are some constant factor >1 multiplying the edge of the semi-circle).

Let $L_p$ label a term for $Z(\tau, p, N, n_{bos})$ with a given choice of m, history, clusters (the clusters need not be minimal), and choice of pairing for all tensors in non-minimal clusters (we do not specify the pairing of the tensors in the minimal clusters; if there are $n_{min}$ minimal clusters then there are $2^{n_{min}}$ possibilities). Let $L'_{2(p-1)}$ label a term for $Z'(\sqrt{2N}\tau, \tau', 2(p-1), N, n_{bos})$ with given m, history, clusters, and pairing. We define a map from choice of $L_p$ to choice of $L'_{2(p-1)}$ so that the value of the sum of terms labeled by $L_p$ is equal to the value of the term labeled by the corresponding $L'_{2(p-1)}$. This map will be one-to-one but it will not be onto. However, since all terms are non-negative, this will establish the needed inequality.

The map is as follows. The m will be the same. Using the notation above, if tensor (i, 1) is in a minimal cluster (and hence, so is i, 2) in the set labeled by $L_p$, then in the history for $L'_{2(p-1)}$ for the i-th term we choose $\tau H(G)$, while if (i,1) is not in a minimal cluster, then we choose $\tau' H'(G')^2$. Given a history labeled by $L_p$, corresponding to a choice of tensor or its complex conjugate (i.e., either G or $\overline{G}$) in each of the m different H(G) in a term in the series for $Z(\tau, p, N, n_{bos})$, then we make the same choice of tensor or its complex conjugate in each of the m different H(G) or H'(G')$^2$ in the history labeled by $L'_{2(p-1)}$. That is, if we choose G in the i-th H(G) in some terms in the series for $Z(\tau, p, N, n_{bos})$, then we choose G in H(G) or G' in both terms in H'(G')$^2$ and similarly if we choose $\overline{G}$ we choose $\overline{G}$ in H(G) and $\overline{G'}$ in both terms in H'(G')$^2$.

We label the tensors in the expansion for $Z'(\sqrt{2N}\tau, \tau', 2(p-1), N, n_{bos})$ either by an integer i, if it appears in H(G), or by a pair (i, w), if it appears in H'(G')$^2$, in which case the index w∈{1,2} labels which of the two H'(G') it is in. Finally, we define the pairing labeled by $L'_{2(p-1)}$. For a minimal cluster labeled by $L_p$, pairing (j, 1) and (i, 2) with (j, 2) or (i,1) with (j, 2) and (i, 2) with (j, 1), then in the pairing labeled by $L'_{2(p-1)}$ we pair i with j.

If a cluster is non-minimal, then we simply use the same pairing for the corresponding tensors in $L'_{2(p-1)}$. That is, suppose a cluster pairs ($i_1$, $w_1$) with ($i_2$, $w'_2$), and pairs ($i_2$, $w_2$) with ($i_3$, $w'_3$), and so on, where $w'_a = 3 - w_a$. Then, we also pair ($i_1$, $w_1$) with ($i_2$, $w'_2$), and pairs ($i_2$, $w_2$) with ($i_3$, $w'_3$), and so on.

The smallest non-minimal cluster has six vertices. In every cluster, minimal or not, there is a sum over some index (for example, the sum over the index $\sigma = \sigma'$ in the lower bound calculation above) which gives a factor N. Thus, taking $\tau' = \tau N^{1/3}$ accounts for this factor. No factor of 2 occurs for the non-minimal clusters.

Remark: since the entries of G were selected from the complex ensemble, $\mathbb{E}[H(G)] = 0$ for p odd. If the entries of G were selected from the real ensemble, then (considering the specific case p=3 for simplicity and not symmetrizing G, again for simplicity) a non-vanishing expectation value since $$\mathbb{E}[T_{\mu_1,\mu_2,\sigma}T_{v_1,v_2,\sigma}] = N\delta_{\mu_1 v_1}\delta_{\mu_2,v_2}, \quad (36)$$

so that $\mathbb{E}[H(G)] \propto N\Sigma_{\mu_1,\mu_2} a_{\mu_2}{}^\dagger a_{\mu_2}{}^\dagger a_{\mu_1} a_{\mu_1}$. Such a term may be referred to as a pairing term or a "cooperon" in the study of disordered system in physics. In the case $n_{bos}=2$ (the smallest possible for p=3), this term may have operator norm $N^2$. This is much larger than $N^{1/2}$ times the expected operator norm of H(G) for p=2(p-1)=4, i.e., that expected operator norm is proportional to N by random matrix theory, and $N^2 \gg N^{3/2}$.

Other embodiments may deal with this expectation value in ways other than using the complex ensemble. In at least one embodiment, the real ensemble may be employed, but to consider the Hamiltonian $H(T_0) - M$, where we define $M = N\Sigma_{\mu_1,\mu_2} a_{\mu_2}{}^\dagger a_{\mu_2}{}^\dagger a_{\mu_1} a_{\mu_1}$ for p=3. In such an embodiment, the added term $-M$ may cancel the expectation value of H(G) term-by-term in the perturbation expansion. However, some additional terms may remain when clusters of four or more vertices are considered. Clusters of six or more vertices may still be negligible, but the structure of the clusters of four vertices becomes more complicated.

From lemma 6, lemma 7 is an immediate corollary.
Lemma 7. Let $\lambda_l$ be the largest eigenvalue of G. Let $$E_{max} = 2J \log(N) n_{bos}{}^{p/2} N^{p/2},$$

where J is the J of lemma 4 for $Z(\tau, 2(p-1), N, n_{bos})$. Then, for any x, $$Pr[\lambda_1 \geq x] \leq \exp\left(-\frac{x - E_{max}}{\xi}\right), \quad (37)$$

with $$\xi = \frac{\sqrt{J}\, n_{bos}^{p/2-1} N^{p/2}}{\sqrt{\log(N)}}. \quad (38)$$

So, for any E' which is $\omega(\xi)$, with high probability $\lambda_1 \leq E_{max} + E'$.

Proof From lemmas 4,6, for $n_{bos}{}^p\tau N^{1/3} = o(1)$, we have $$Z(\tau,p,N,n_{bos}) \leq \exp(\tau^2 J n_{bos}{}^{p-1} N^p) \cdot \exp(o(N^{(p-1)/2})).$$

Let $\tau = n_{bos}{}^{1-p/2} N^{-p/2} \sqrt{\log(N)}/\sqrt{J}$. For $n_{bos} = o(N^{(p/2-1/3)/(1+p/2)} \log(N)^{1/(2+p)})$, the condition $n_{bos}{}^p \tau N^{1/3} = o(1)$ holds. So, after some algebra, for any x, the result follows.

Lemma 6 has the following corollary:
Corollary 2. For odd p, for $n_{bos} = p - 1$, with high probability $\lambda_1 = O(N^{p/2})$.

Proof. To prove this we use the existence of tighter bounds for even $q=2(p-1)$ when $n_{bos}=q/2$. By Eq. (32), for $n_{bos}^p \tau N^{1/3}=o(1)$, we have $Z(\tau, p, N, n_{bos}) \leq Z(\sqrt{2N}\tau, 2(p-1), N, n_{bos}) \exp(o(N^{(p-1)/2}))$. Since we are considering fixed $n_{bos}$, this holds for $\tau N^{1/3}=o(1)$. We have that
$Z(\sqrt{2N}\tau, 2(p-1), N, p-1) =)_G[\exp(\sqrt{2N}\tau H(G)]$, but the Hamiltonian $H(G)$ is a random matrix of size $N^{p-1}$-by-$N^{p-1}$ chosen from the so-called Gaussian unitary ensemble. With high probability, the largest eigenvalue of this matrix is $\Theta(N^{(p-1)/2})$. Further, we can choose $\tau=\omega(\log(N)N^{-p/2})$ so that $Z(\sqrt{2N}\tau, 2(p-1), N, p-1) = N \exp(O(\tau N^{p/2}))$; for example, this can be shown by using orthogonal polynomials to bound the probability distribution of the largest eigenvalue as discussed previously. We have $\Pr[\lambda_1 > x] \leq Z(\tau, p, N, n_{bos}) \exp(-\tau x)$. For $x$ sufficiently large compared to $N^{p/2}$, for $\tau=\omega(\log(N)N^{-p/2})$, the right-hand side is $o(1)$.

Quantum and Classical Algorithms

The time and space complexity of classical and quantum embodiments, which implement the linear algebra, for the PCA of tensors are now discussed. In particular, whether the largest eigenvalue is larger than $E_{cut}$ is determined. Furthermore, a vector in the eigenspace of eigenvalue $\geq E_{cut}$ is generated. It is noted that it may not be necessary to determine the leading eigenvector itself.

The notation $\psi_{target}$ is employed to denote the leading eigenvector. Note that if the squared overlap of some vector with $\psi_{target}$ is lower bounded, this may lower bound the probability of success of phase estimation.

In at least a portion of the quantum embodiments, to obtain some vector in the eigenspace of eigenvalue $\geq E_{cut}$ an approximate projector by phase estimation is employed in the quantum algorithms onto the eigenspace of eigenvalue $\geq (E_0+E_{cut})/2 = (3/4)E_0 + (1/4)E_{cut}$. By doing this, the phase estimation error may become negligible when considering the projection of the resulting vector onto the eigenspace with eigenvalue $< E_{cut}$. Similarly, in at least a portion of the classical embodiments, the number of iterations may be made sufficiently large, such that the vector has negligible projection on the eigenspace with eigenvalue $< E_{cut}$ and further so that it has expectation value for $H(T_0)$ greater than $E_{cut}$.

Firstly, at least some of the classical embodiments are discussed below. The discussed time and space requirements for the classical embodiments are not intended to represent a lower bound. Rather, the discussed requirements may represent times that may be achieved using conventional algorithms. Next, at least some of the quantum embodiments are discussed. Finally, a further improved to the quantum embodiment that may be useful in practice is discussed.

When "space" is discussed in the context of classical embodiments, a $D(N,n_{bos})$-dimensional vector may be stored in digital memory. The space requirement for the digital memory may be determined by $D(N,n_b)$ multiplied by the number of digital bits required to store a single entry of the vector. The entries of the matrix $H(T_0)$ may be polynomially large in $N,n_b$. A single entry of the vector might need to be stored to accuracy inverse polynomial in $D(N,n_b)$, but even though $D(N,n_b)$ is potentially very large, the required number of bits scales as $O(n_{bos} \log(N))$, so that the space requirements may be logarithmic in N.

Classical Embodiments

In classically embodiments, an eigen-decomposition on $H(T_0)$ may be performed. Matrices of size $D(N,n_{bos})$-by-$D(N,n_{bos})$ may be stored, and the required space may scale as $\tilde{O}(D(N,n_{bos})^2)$. The computation time may be indicated as $D(N,n_b)^\omega$, where $\omega$ is a matrix multiplication exponent. In some embodiments, the requirement time may be closer to $D(N,n_{bos})^3$.

In at least some embodiments, there may not be a requirement to perform a full eigen-decomposition. Rather, a random vector may be initialized. A power method may be iteratively applied to extract some eigenvector of $H(T_0)$ in the eigenspace with eigenvalue $\geq E_{cut}$. The space required may then be reduced to $\tilde{O}(D(N,n_{bos}))$. The time required for a single iteration of the application of the power method may be $\tilde{O}(D(N,n_{bos}))$. If $\lambda=\bar{\lambda}$, then in $O(\log(D(N,n_{bos}))/\log(E_0/E_{max}))$ iterations, the resulting vector will have an $1-o(1)$ projection onto the eigenspace with eigenvalue $\geq (E_0+E_{cut})/2$ and a negligible projection onto the eigenspace with eigenvalue $< E_{cut}$. So, after one or more iterations, the expectation value of $H(T_0)$ on that vector may be determined to perform detection, i.e., if $\lambda=\bar{\lambda}$ the expectation will be larger than $E_{cut}$ but if $\lambda=0$ the expectation will be close to $E_{max}$). The single particle density matrix of the vector may be determined after the one or more iterations. So, the time requirement may scale as $\tilde{O}(D(N,n_{bos}))O(1/\log(E_0/E_{max}))$.

In various embodiments, the power method may require exponential (in $n_{bos}$) space. In other embodiments, only polynomial space may be required. A "path integral" may be performed in at least one embodiment. That is, given a random initial state $\Psi_{random}$, the power method may determine the state $H(T_0)^m|\Psi_{random}\rangle$, for some exponent m which gives the number of iterations in the power method.

$$\frac{\langle \Psi_{random}|H(T_0)^m a_\mu^\dagger a_\nu H(T_0)^m|\Psi_{random}\rangle}{\langle \Psi_{random}|H(T_0)^{2m}|\Psi_{random}\rangle},$$

where the denominator is to correctly normalize the state, may be computed. An initial state may be selected to be a (normalized) random state from the basis for the symmetric basis given before. This choice may be made to make the "path integral" simpler. Since this may be a complete orthonormal basis of states, a random state from this basis may have an expected overlap with the largest eigenvector of $H(T_0)$ equal to $1/N^{n_{bos}}$. Then, both the numerator and denominator above may be expressed by a summation over intermediate states from this basis, requiring only space $\tilde{O}(\log(D(N, n_{bos}))m)$. This summation may be a "path integral". The operator $H(T_0)$ may not be unitary, of course. However, this does not prevent introducing this summation. And in these embodiments, the time required may scale as $\tilde{O}(D(N, n_{bos})^m)$.

In other embodiments, an improvement to this time may be achieved, via a method for a single qudit of dimension $D(N, n_{bos})$. This method is explained as follows. This method may be employed to compute $\langle y|C|x \rangle$, for some fixed basis states x,y from the basis above (in our application x=y, where C is a "circuit" of some depth d (for example C=2m+1 for the numerator above and C=m for the denominator above). Here, a circuit is not necessarily unitary. Rather, C may be generated via a sequence of operations. Each of these operations may include an application of at least one of $H(T_0)$ or a $a_\mu^\dagger \forall a_\nu$. More generally, a circuit may include any operations built out of some tensor multiplying some number of creation and annihilation operators. For d=1, the circuit may be computed in time poly($n_{bos}$). For d>1, we have $$\langle y|C|x\rangle = \sum_z \langle y|C_{[d\leftarrow d/2+1]}|z\rangle \cdot \langle z|C_{[d/2\leftarrow 1]}|x\rangle, \qquad (39)$$

where the summation is over states z in the basis and where $C_{[d\leftarrow d/2+1]}$ and $C_{[d/2\leftarrow 1]}$ are sub-circuits from the second and first half of C. If F(d) is the runtime at depth d, then $F(d)\leq 2\cdot D(N,n_{bos})\cdot F(\lceil d/2\rceil)$. So, $F(d)\leq \text{poly}(n_{bos})(2D(N,n_{bos}))^{\lceil \log(d)\rceil}$. So, the runtime may be indicated as: $\tilde{O}((2D(N, n_{bos}))^{\lceil \log(2m+1)\rceil})$. This runtime may be significantly faster than the path integral method. In some embodiments, this runtime may be slower than the above described power method, depending on the required m, i.e., for $E_0/E_{max}=\Theta(1)$. m may be proportional to $\log(D(N, n_{bos}))$, such that the time required is super-polynomially worse than the time required if the full vector is stored.

Quantum Algorithms

Various quantum embodiments will now be discussed. In contrast to the classical embodiments above, the various quantum embodiments may require only polynomial space. A first quantum method is described, via algorithm 3. Various improvements to this first quantum method (e.g., algortihm 3) are described via the subsequent algorithms.

For algorithm 3 and all subsequent algorithms, it may be assumed that $\lambda=\overline{\lambda}$, i.e., for purposes of analysis, the problem of recovery rather than detection is considered. These algorithms may report success or failure and, if failure is reported, the alorithm may be rerun until the algorithm succeeds. Bounds on the expected runtime, are provided, under the assumption that $\lambda=\overline{\lambda}$. If the problem of detection were considered, and if $\lambda=0$, then at least algorithm 3 may not report success in the given runtime (since it will be unable to succeed in a certain phase estimation procedure) and so all these algorithms may also be employed for detection by running them for some multiple of the given runtime and reporting that $\lambda=0$ if success is not reported in that time.

Maximally Entangled (or Maximally Mixed) Input State

The various quantum methods and algorithms may work on a Hilbert space that is the tensor product of two Hilbert space, each of which having dimension $D(N,n_b)$. In some embodiments, it may be convenient to embed the symmetric subspace of dimension $D(N,n_b)$ within the full Hilbert space.

The tensor product notation A⊗B may denote an operator that is a tensor product of two operators A, B on the two different tensor factors.

---

Algorithm 3 Quantum Algorithm (simplest, un-amplified version).
This and all other quantum algorithms have the same inputs,
outputs, and parameter choices as algorithm 2.

1. Prepare a maximally entangled state between the two qudits.
2. Apply phase estimation using H($T_0$) ⊗ I. Let ψ be the resulting state. If the resulting eigenvalue is larger than ($E_0 + E_{cut}$)/2, report "success". Otherwise, report "failure".
3. If success is reported, measure and return $\langle\psi|a_\mu^\dagger a_\nu \otimes I|\psi\rangle$.

---

Steps 1-2 of algorithm 3 may prepare a state whose density matrix on the first qudit has a large projection onto the eigenspace of eigenvalue≥$E_{cut}$. For purposes of analysis, the second qudit is traced, so that the input state on the first qudit is a maximally mixed state. If success is reported then (ignoring phase estimation error) a vector projected onto this eigenspace is generated. Ignoring the phase estimation error, the probability of success is ≥1/D(N,$n_b$).

Remark: In various embodiments, a maximally entangled state between the two qudits may be prepared and/or generated, so that the density matrix on the first state is maximally mixed. In other embodiments, algorithm 3 may be modified to employ a single qudit (reducing the space by a factor of 2) and prepare a random state on the first qudit. This modification may require care when discussing algorithm 4, which is a version of algorithm 3 that employs amplitude amplification. In the unamplified version (e.g., algorithm 3), a new random state (e.g., choosing it uniformly from any orthogonal basis) may be selected and/or chosen, each time phase estimation is performed. However, in the amplified version (e.g., algorithm 4, a fixed random initial state on the first qudit may be selected, and amplitude amplification is performed with that choice of initial state. It can be shown that if a random state on a single qudit of dimension N is selected, and the $n_{bos}$-fold tensor product of that state is generated, with high probability the state has squared overlap with the leading eigenvector close to $N^{-n_{bos}}$. More particularly and in some embodiments, "close" may mean that with high probability the logarithm of the squared overlap is at least $-n_{bos}\log(N)\cdot(1+o(1))$.

Step 3 of algorithm 3 generates a measurement and/or determination of some property of a state in the eigenspace with eigenvalue≥$E_{cut}$. It may be possible that each time algorithm 3 is run, a different energy measurement is generated, and hence a different state is generated. Accordingly, measuring this property of the state may provide expectation value of $a_\mu^\dagger a_\nu$ in a mixed state. This may now be consequential since theorems 3 or 5 also hold for mixed states.

The measurement in step 3 of algorithm 3 is discussed below. A first possibility is to measure at least one matrix element of $a_\mu^\dagger a_\nu$. Since there are $N^2$ matrix elements, algorithm 3 may need repeated poly(N, log(ε)) times to measure each matrix element to accuracy ε. Various improvements over this first possibility are discussed below.

Phase estimation is discussed below. Algorithm 3 may be discussed as follows. The phase estimation may be performed to a precision sufficiently smaller than $E_0-E_{max}$. Then eigenbasis of H($T_0$) may be employed. Let ε be a bound on the error probability of the phase estimation. More precisely, it may be stated that phase estimation implements an operator $E_{PE}$, which may be diagonal in the eigenbasis such that on a normalized eigenvector $v_i$ with the corresponding eigenvalue $\lambda_i$, the following expressions hold:

$$\lambda_i<E_{cut}\rightarrow\langle v_i|E_{PE}|v_i\rangle\leq\tilde{\epsilon},$$

$$\lambda_i>(\tfrac{7}{8})E_0+(\tfrac{1}{8})E_{max}\rightarrow\langle v_i|E_{PE}|v_i\rangle\geq 1-\tilde{\epsilon}. \qquad (40)$$

There may be a few energy scales here that are chosen arbitrarily. Knowledge of precise values for the energies may not be required. $E_{cut}$ may be selected to be partway between $E_0$ and $E_{max}$ so that it is very unlikely that the largest eigenvalue of H(G) is above $E_{cut}$ and also very unlikely that the $\lambda_1<E_{cut}$. The energy cutoff in step 2 of algorithm 3 may be selected to be ($E_0+E_{cut}$)/2 simply to pick some energy partway between $E_0$ and $E_{cut}$ so that it is very unlikely that Eq. (40) succeeds. In the last line of Eq. (40), $(\tfrac{7}{8})E_0+(\tfrac{1}{8})E_{max}$ is written simply to pick some energy scale slightly below $E_0$. Rather, it may suffice to include a bound for $\lambda_i\geq(1-\eta)E_0+\eta E_{max}$ for any η>0. The two lines in Eq. (40) may not be completely symmetric about ($E_0+E_{cut}$)/2.

$\tilde{\epsilon}=\epsilon/D$ (N, $\eta_{bos}$) may be selected such that algorithm 3 reports success with probability at least (1-$\tilde{\epsilon}$)/D(N,$n_{bos}$). When the algorithm reports success, the resulting state may include a projection onto the eigenspace with eigenvalue$\geq E_{cut}$. The eigenvalue may be greater than or equal to $$\frac{(1-\tilde{\epsilon})}{1-\tilde{\epsilon}+(D(N,n_{bos})-1)\tilde{\epsilon}} = 1 - O(\epsilon)$$

The first term in the denominator of this expression may be the probability that it reports success on $\psi_{target}$ as input. The second term may be the probability of reporting success on a state in the eigenspace with eigenvalue$<E_{cut}$, multiplied by $D(N, n_{bos})-1$, i.e., multiplied by an upper bound on the dimensionality of that eigenspace. Taking $\epsilon<<1$, a large projection onto the eigenspace with eigenvalue$\geq E_{cut}$ may be generated, so that the cost of phase estimation increases logarithmically with $D(N,n_{bos})\epsilon$.

The success probability for $\epsilon<<1$ is greater than or equal to $(1/D(N,n_{bos}))(1-\epsilon/D(N,n_{bos}))$, so for small $\epsilon$ it is very close to $1/D(N,n_{bos})$. Hence, when repeating algorithm 3 until it succeeds, the expected runtime to obtain a single measurement of one matrix element of $a_\mu^\dagger a_\nu$ is the time for phase estimation multiplied by $O(1/D(N, n_{bos}))$.

In performing phase estimation, controlled simulation of the Hamiltonian $H(T_0)$ may be employed. There are various quantum simulation algorithms, which may be utilized here. There may be two broad possibilities. The first possibility is to work in the symmetric subspace of dimension $D(N, n_{bos})$. In this case, $H(T_0)$ is a sparse Hamiltonian, and sparse simulation algorithms apply. The second possibility is to use the Hamiltonian of Eq. (5) and embed the symmetric subspace into the full Hilbert space. For this second possibility, $H(T_0)$ is a local Hamiltonian, in that each terms acts on a small number of qudits, each of dimension N, and local simulation algorithms apply The cost for these algorithms to simulate for a time t to error E is $poly(t\|H(T_0)\|, n_{bos}, N, \log(\tilde{\epsilon}))$.

Using at least some of the available phase estimation algorithms, the number of bits that phase estimation is performed on may be indicated as $s=O(\log(\|H(T_0)\|/(E_0-E_{max}))$. The most expensive bit to obtain is the least significant bit, since obtaining the j-th least significant bit requires simulating for a time proportional to $2^{s-j}(E_0-E_{max})^{-1}$. The least significant bit to error $\tilde{\epsilon}/2$ may be generated. The next least significant bit to error $\tilde{\epsilon}/4$ may then be generated, and so on. For the resulting total error $\tilde{\epsilon}$. Any one of a large number of variations of the Kitaev phase estimation algorithm may be employed.

With high probability, $\|H(T_0)\|$ is poly(N). Thus, with high probability the time for phase estimation is $poly(N, n_{bos}, 1/(E_0-E_{max}), \log(D(N, n_{bos})/\epsilon))$, giving an algorithm runtime $D(N, n_{bos})poly(N, n_{bos}, 1/(E_0 E_{max}), \log(D(N, n_{bos})/\epsilon))$.

Algorithm 3 may be sped-up quadratically by applying amplitude amplification. As shown in algortihm 4, the phase estimation step 2 of algorithm 3 may be modified, such that the algorithm 4 phase estimates the eigenvalue, determines if the eigenvalue is larger than $E_{cut}$, then uncomputes the eigenvalue, returning just a single bit of success or failure. Then, applying amplitude amplification, with high probability, the algorithm succeeds in expected time $D(N,n_{bos})^{1/2}poly(N, n_{bos}, 1/(E_0-E_{max}), \log(D(N, n_{bos})/\epsilon))$. Multiplying by $poly(N, 1/\epsilon)$ to measure $a_\mu^\dagger a_\nu$ to accuracy $\epsilon$, the expected time may still be $$D(N,n_{bos})^{1/2}poly(N,n_{bos},1/(E_0-E_{max}),\log(D(N,n_{bos})/\epsilon))$$

Thus, providing a quadratic time improvement (and exponential space improvement) over the fastest classical algorithm described above.

---

Algorithm 4 Quantum Algorithm (amplified version)

1. Apply amplitude amplification to steps 1-2 of algorithm 3, modifying step 2 to uncompute the eigenvalue and return only success or failure.
2. If success is reported, measure and return $\langle\psi|a_\mu^\dagger a_\nu \otimes I|\psi\rangle$.

---

Chosen Input State: Simple Version

A further quadratic speedup may be achieved by modifying the initial state that are phase estimated in algorithm 3 and algorithm 4. Algorithm 5 is analogous to algorithm 3, however, the initial state in algorithm 5 is modified from the maximally entangled input state of algorithm 3. Similarly, algorithm 6 is analogous to algorithm 4, however, the initial state in algorithm 6 is modified from the maximally entangled input state of algorithm 4.

The basic idea for both algorithm 5 and algorithm 6 is a modification of initial state preparation. Results for these algorithm 5 and algorithm 6 are provided below. In particular, a lower bound on the average inverse runtime is proved, rather than an upper bound on the average runtime. In the next subsubsection, algorithm 7 is discussed. Algorithm 7 provides a modification to algorithm 5 and algorithmqalginitamp. This modification may avoid enables a proof for a quadratic improvement without further assumption.

In algorithm 5 and algorithm 6, instead of a maximally entangled state, the tensor $T_0$ is employed to prepare and/or generate an input state that includes a larger projection onto $\psi_{target}$. A single qudit of dimension $D(N, n_{bos})$ may be employed. The unamplified version is algorithm 5 and a version with amplitude amplification is algorithm 6.

The step in algorithm 5 and algorithm 6 that includes preparing the modified initial state preparation is discussed in this subsubsection. Given a classical list of amplitudes for some M-dimensional vector, with the vector having unit norm, a quantum state on an M-dimensional qudit with the given amplitudes (up to an ill-defined overall phase, of course) may be prepared using a quantum circuit of depth O(M) and using O(M) classical computation. For example, labeling the basis states $|0\rangle, |1\rangle, \ldots, |M-1\rangle$, one can start with initial state $|0\rangle$ and apply a sequence of M−1 rotations in the two dimensional sub-spaces spanned by $|i\rangle, |i+1\rangle$ for $i=0, \ldots, M-2$.

In this subsubsection, the $D^{n_{bos}}$-dimensional Hilbert space of Eq. (5) is assumed, so that $n_{bos}$ qudits are employed, each of dimension N.

---

Algorithm 5 Quantum Algorithm
(improved input state, unamplified version)

1. Use $T_0$ to prepare the initial state $\Psi_{input}$ of Eq. (41).
2. If the initial state is not in the symmetric subspace, report "failure". If the state is in the symmetric subspace, apply phase estimation using $H(T_0)$ Let $\psi$ be the resulting state. If the resulting eigenvalue is larger than $(E_0 + E_{cut})/2$, report "success". Otherwise, report "failure".
3. If success is reported, measure and return $\langle\psi|a_\mu^\dagger a_\nu \otimes I|\psi\rangle$.

---

Algorithm 6 Quantum Algorithm (amplified version)

1. Apply amplitude amplification to steps 1-2 of algorithm 5, modifying step 2 to uncompute the eigenvalue and uncompute the determination of whether the state is in the symmetric subspace and return only success or failure.
2. If success is reported, measure and return $\langle\psi|a_\mu^\dagger a_\nu \otimes I|\psi\rangle$.

In this subsubsection, and for simplicity in analysis, it may be assumed that the error $\epsilon$ in phase estimation is small enough to be negligible. A similar method may be employed to prepare the modified input state for both p even or p odd. T case that $n_{bos}$ is an integer multiple of p is considered first. For any tensor T of order p, let $|T\rangle$ the vector on p qudits (each of dimension N) with amplitudes given by the entries of the tensor. This vector is correctly normalized if $|T|=1$. The modified input state is prepared as indicated in equation 41.

$$\Psi_{input} = \frac{1}{|T_0|^{n_{bos}/p}} |T_0\rangle^{\otimes n_{bos}/p}. \quad (41)$$

The determination of the overlap $\langle \Psi_{input} | \Psi_{target} \rangle$ is shown below. However, first an estimate of the overlap $\langle \Psi_{input} | \Psi_{sig} \rangle$ is shown.

$$\langle v_{sig}^{\otimes p} | T_0 \rangle = \lambda N^p + \langle v_{sig}^{\otimes p} | G \rangle. \quad (42)$$

The probability distribution of $\langle v_{sig}^{\otimes p} | G \rangle$ is a Gaussian with zero mean and unit variance, so with high probability, $\langle v_{sig}^{\otimes p} | G \rangle$ is $o(N^p)$. Indeed, for any increasing function of N which diverges as $N \to \infty$, with high probability it is bounded by that function.

Hence, with high probability, $$\langle v_{sig}^{\otimes n_{bos}} | T_0^{\otimes n_{bos}/p} \rangle = (1-o(1)) \cdot \lambda^{n_{bos}/p} N^{n_{bos}}. \quad (43)$$

At the same time, $$\langle T_0^{\otimes n_{bos}/p} | T_0^{\otimes n_{bos}/p} \rangle = |T_0|^{2n_{bos}/p}. \quad (44)$$

$\mathbb{E}[|G|^2] = O(N^p)$, where the precise constant in the big-O notation depends on whether we symmetrize G or not and whether we use complex entries or not. Further, $|G|^2$ is a sum of squares of independent random variables (the entries of G). The central limit, with high probability $|G|^2$ is bounded by $O(N^p)$. So with high probability, $|T_0|^{2n_{bos}/p} = O(N^{n_{bos}})$.

With high probability, $$\frac{|\langle v_{sig}^{\otimes n_{bos}} | T_0^{\otimes n_{bos}/p} \rangle|^2}{\langle v_{sig}^{\otimes n_{bos}} | v_{sig}^{\otimes n_{bos}} \rangle \cdot \langle T_0^{\otimes n_{bos}/p} | T_0^{\otimes n_{bos}/p} \rangle} \geq (1 - o(1)) \cdot \lambda^{2n_{bos}/p}. \quad (45)$$

For $\lambda = CN^{-p/4}$, this is $(1-o(1))C^{2n_{bos}/p} N^{-n_{bos}/2}$.

If $\psi_{target}$ were equal to $\Psi_{sig} = N^{-n_{bos}/2} |v_{sig}^{\otimes n_{bos}}\rangle$, then Eq. (45) would give a lower bound to the squared overlap of the initial state with $\psi_{target}$ which would be quadratically better (for larger N) than the squared overlap for the maximally entangled input state. So, after applying amplitude amplification, this would give a quartic improvement over the fastest classical algorithm.

$\psi_{target}$ may not be equal to $\Psi_{sig} = N^{-n_{bos}/2} |v_{sig}^{\otimes n_{bos}}\rangle$ and so this may not provide a lower bound on $\langle \psi_{target} | \Psi_{input} \rangle$. However, lemma 8 may be relied upon.

Lemma 8. Suppose that $E_0 \geq (1+c) E_{max}$. Then, the projection of $\Psi_{sig}$ onto the eigenspace with eigenvalue$\geq (7/8)E_0 + (1/8)E_{max}$ is greater than or equal to $\Omega(1) \cdot c/(1+c)$.

Proof. The expectation value $\langle \Psi_{sig} | H(T_0) | \Psi_{sig} \rangle$ was estimated in the above subsection "Classical Algorithms" and in the above subsection "Quantum Algorithms," both of this section "Quantum and Classical Algorithms." We have that with high probability this expectation value is $\geq (1-o(1))E_0$. With high probability, the largest eigenvalue of $H(T_0)$ in absolute value is bounded by $(1+o(1))(E_0 + E_{max})$; for the odd case this uses lemma 3. Hence, the projection of $\Psi_{sig}$ onto the eigenspace with eigenvalue$\geq (7/8)E_0 + (1/8)E_{max}$ is greater than or equal to $(1-o(1))E_0 - ((7/8)E_0 + (1/8)E_{max})/((1+o(1))(E_0 + E_{max}))$ which is $\geq \Omega(1) \cdot c/(1+c)$. □

So, $\Psi_{sig}$ has some projection onto the desired eigenspace. However, this may not provide a lower bound on $\langle \Psi_{input} | E_{PE} | \Psi_{input} \rangle$. $\Psi_{input}$ may be expanded as a linear combination of $\Psi_{sig}$ and some orthogonal state, where the cross terms in the expectation value are not yet bounded.

Heuristic evidence (but not a proof) for a lower bound on $\mathbb{E}[\langle \Psi_{input} | E_{PE} | \Psi_{input} \rangle]$ is provided below. It may be assumed that $\lambda_1 = E_0 \cdot (1+o(1/\log(N)))$. This assumption may be proven to hold with high probability. The case of even p if now considered (we expect that odd p can be handled similarly).

A reason that no full proof is provided is that a lower bound on $)[\langle \Psi_{input} | E_{PE} | \Psi_{input} \rangle]$ will only imply a lower bound on the expected inverse squared runtime, rather than an upper bound on the expected runtime. In the next subsubsection (i.e., "Chosen Input State: Modified Version"), algorithm 6 is provided. Algorithm 6 is a modified algorithm with an upper bound on the expected runtime. Algorithm 6 may provide a quartic speedup with high probability.

Some terminology is now clarified to distinguish two meanings of the word "expected", corresponding to averages over G or averages over outcomes of a quantum algorithm. As used throughout, the term "runtime" of a phase estimation algorithm may refer to the expected runtime for a given choice of G. The term "expectation value of the runtime" may refer to the expectation value over G of this expected runtime. Applying amplitude amplification, the runtime is bounded by the time for the state preparation and phase estimation multiplied by the inverse square-root of $\langle \Psi_{input} | E_{PE} | \Psi_{input} \rangle$. So, lower bounding $\mathbb{E}_G[\langle \Psi_{input} E_{PE} | \Psi_{input} \rangle]$ will upper bound the expectation value over G of the inverse squared runtime and we will find a bound on the expectation value of the inverse squared runtime by $$(N^{n_{bos}/4} \text{poly}(N, n_{bos}, 1/E_0 - E_{max}), \log(D(N, n_{bos})/\epsilon)))^{-2}$$
$$(N^{p/4}/\lambda)^{-2n_{bos}/p}$$

in the case that $E_0 > E_{max} \cdot (1+c)$ for any $c>0$. For fixed p, fixed $N^{p/4}/\lambda$, and large N, this is a further quadratic improvement over the amplitude amplification algorithm above.

Given the existence of the modified algorithm 6, an outline of a possible proof of the lower bound on $\mathbb{E}[\langle _{input} | E_{PE} | \Psi_{input} \rangle]$ is provided below. The proof is based on providing an expression for the overlap as a tensor network in some approximation which amounts to, ignoring fluctuations, averaging the tensor network by a sum of pairings. This sum is employed to lower bound the expectation value. Roughly, the physical idea is that the terms in $\Psi_{input}$ proportional to G will tend on average to increase the overlap $\langle \Psi_{input} | \psi_{target} \rangle$, rather than decrease it.

An operator, which may be diagonal in the energy basis and may be upper bounded by $E_{PE}$ by the power method may be obtained, e.g., by taking $\lambda_1^{-m} H(T_0)^m$ for large m. If m is sufficiently large compared to $n_{bos} \log(N)/\log(E_0/E_{max})$, then this will approximate the projector up to error $N^{-n_{bos}}$ which suffices. In such cases, it may suffice to take $m = n_{bos} \log(N)$.

For the range of m that are considered here, it may be sufficient to ignore the fluctuations in $\lambda_1$, i.e., and the following approximation may be applicable:

$$|\langle\Psi_{input}|E_{PE}|\Psi_{input}\rangle|^2 \approx (\mathbb{E}[\lambda_1])^{-m}\mathbb{E}[\langle\Psi_{input}|H(T_0)^m|\Psi_{input}\rangle] \quad (46)$$

$$\approx (\mathbb{E}[\lambda_1])^{-m}\frac{1}{\mathbb{E}\left[\langle T_0^{\otimes n_{bos}/p}|T_0^{\otimes n_{bos}/p}\rangle\right]} \times \quad (47)$$

$$\left(\mathbb{E}\left[\langle T_0^{\otimes n_{bos}/p}|H(T_0)^m|T_0^{\otimes n_{bos}}\rangle\right]\right)$$

where in the second line is further approximated, such that fluctuations in the norm $\langle T_0^{\otimes n_{bos}/p}\rangle$ may be ignored. That is, the norm may be treated as a constant. This assumption may be justified via a large deviation argument on the norm of the tensor.

The quantity $\langle T_0^{\otimes n_{bos}/p}|H(T_0)^m|T_0^{\otimes n_{bos}/p}\rangle$ may be evaluated by a sum of tensor networks, using the full Hilbert space, e.g., for each of m choices of $i_1, \ldots, i_{p/2}$ in each of the m factors of $H(T_0)$ in a tensor network). Each tensor network may be written as a sum of tensor networks, inserting either $\lambda v_{sig}^{\otimes n}$ or G for each tensor. These tensor networks may be averaged over G via various methods. Since each term in this sum over networks and pairings may be positive, a lower bound may be determined by restricting consideration to a subset of the terms. Restricting consideration to the terms in which for $\Psi_{input}$, $\lambda v_{sig}^{\otimes p}$ may be selected for every tensor. For this set of terms, the tensor network may computes $\mathbb{E}[\langle\lambda^{n_{bos}/p}v_{sig}^{\otimes bos}|H(T_0)^m|\lambda^{n_{bos}/p}v_{sig}^{\otimes n_{bos}}\rangle]$. This in turn is $(E_0 \cdot (1-o(1))^m|\lambda^{n_{bos}/p}v_{sig}^{\otimes n_{bos}}|^2$, since $\langle\Psi_{sig}|H(T_0)|\Psi_{sig}\rangle \geq E_0 \cdot (1-o(1))$. In this case for m=log(N), the o(1) term is actually o(1/m) such that in fact the tensor network is $E_0^m|\lambda^{n_{bos}/p}v_{sig}^{\otimes n_{bos}}|^2$.

So, with these approximations lower bound for $\mathbb{E}[\langle\Psi_{input}|E_{PE}|\Psi_{input}\rangle]$ may be determined.

In some embodiments, the algorithm as described may require determining whether the subspace is a symmetric subspace. Note that the input state $\Psi_{input}$ need not be in the symmetric subspace. Such a projection can be done, for example, by phase estimating a Hamiltonian which is a sum of permutation operators. One can also omit this projection onto the symmetric subspace since our upper bounds on H(G) holds both in the full Hilbert space and in the symmetric subspace.

The case that $n_{bos}$ is an integer multiple of p is considered above. If $n_{bos}=kp+l$ for some integers k, l with 0<l<p, then l ancilla qudits may be employed. The qudits may be prepared in an input state which is equal to $$\frac{1}{|T_0|^k}|T_0\rangle^{\otimes k},$$

on kp qudits, tensored with a maximally entangled state between the remaining l qudits and the remaining l ancilla qudits. An additional quadratic improvement in overlap on kp of the qudits may be achieved. The remaining l ancilla qudits may cost only 1/poly(N) overlap since l=O(1).

Chosen Input State: Modified Version

This subsection presents algorithm 7, which provides a modification to algorithm 5 and to algorithm 6. The modification of algorithm 7 enables providing a proof for the quadratic improvement without further assumption. Consider given $T_0$. Let $\Delta$ be a p-th order tensor, chosen from the same distribution as G. Consider tensor $T_0'=T_0+x\Delta$ for some scalar x. The tensor $G' \equiv G+x\Delta$ has Gaussian entries with variance of the entries equal to $1+x^2$. The eigenvector of H(T), with maximum eigenvalue, may be written as $\Psi_{input}(T)\equiv|T|^{-n_{bos}/p}T^{\otimes n_{bos}/p}\rangle$ and $\psi_{target}(T)$.

G may be written as:

$$G = \frac{1}{1+x^2}(G+x\Delta)+\frac{x}{1+x^2}(xG-\Delta) \quad (48)$$

$$= \frac{1}{1+x^2}G'+\frac{x}{\sqrt{1+x^2}}\sqrt{1+x^2}(xG-\Delta)$$

Let $\delta = \sqrt{1+x^2}(xG-\Delta)$. The two random variables G' and $\delta$ may have vanishing co-variance, so G may be expressed as a scalar multiple of G' plus an additional Gaussian random variable which is independent of G'.

Given G and G', let $$G(y) = yG'+(1-y)G = \left(y+\frac{1-y}{1+x^2}\right)G'+\frac{x(1-y)}{\sqrt{1+x^2}}\delta. \quad (49)$$

so that G(y) linearly interpolates between G and G'.

Algorithm 7 may take a given G as input. Algorithm 7 randomly perturbs G to generate G'. In some embodiments, algorithm 7 may then consider several input states $\Psi_{input}(\lambda v_{sig}^{\otimes p}+G(y))$ with different choices of $y \in [0, 1]$.

A property of the normalization may be relied upon. Consider $$\Psi_{input} = \frac{1}{|T_0|^{n_{bos}/p}}|T_0\rangle^{\otimes n_{bos}/p}.$$

As shown above, with high probability $|T_0|^{n_{bos}/p}=O(N^{n_{bos}/2})$. Below, this normalization factor $|T_0|^{n_{bos}/p}$ is treated as a constant. For example, the normalization may depend on N, $n_{bos}$, but we its dependence on G may be ignored here. Furthermore, other normalization factors, such as but not limited to $|\Psi_{input}(\lambda v_{sig}^{\otimes p}+G(y))|$, may also be treated as constants.

The following definition, which includes an abuse of notation, $[\Psi_{input}(y)=\Psi_{input}(\lambda v_{sig}^{\otimes p}+G(y))$ is employed. Further, $\Psi_{input}(y)$ may be expanded as a series in $\delta$ and $\Psi_{input}^0(y)$ indicates the zeroth order term in $\delta$.

The terms in $\delta$ may be ignored when considering $\langle\Psi_{input}^0(y)|E_{PE}|\Psi_{input}^0(y)\rangle$. To clarify the terminology, $\langle\Psi_{input}^0(y)|E_{PE}|\Psi_{input}^0(y)\rangle$ may refer to a "quantum expectation value of $E_{PE}$ in state $\Psi_{input}^0(y)$, to distinguish this from an expectation value over some random variable.

The state $\Psi_{input}^0(y)$ may be expanded as a series in G'. The zero-th order term in G' may be equal to $\langle(\lambda v_{sig}^{\otimes p})^{\otimes n_{bos}/p}|E_{PE}|(\lambda v_{sig}^{\otimes p})\rangle$, which is lower bounded in lemma 8. Accordingly, $\lambda^{n_{bos}/p} N^{n_{bos}/2}\Omega(1) \cdot c/(1+c)$. Including the higher terms in G' and expressing this as a series in $(1+x^2)^{-1}$, the quantity $\langle\Psi_{input}^0(y)|E_{PE}|\Psi_{input}^0(y)\rangle$ may be a polynomial of degree $2n_{bos}$. This polynomial may be expressed as the sum:

$$\sum_{i \geq 0} a_i\left(y+\frac{1-y}{1+x^2}\right)^i,$$

where $a_0$ is the zeroth order term.

The following lemma may employ a result of polynomials.

Lemma 9. Let p(z) be a polynomial of degree $2n_{bos}$. Let [a,b] be an interval which does not contain 0. Then, $$\max_{z \in [a,b]} |p(z)| \geq \left|\frac{a+b}{b-a}\right|^{-2n_{bos}} \exp(O(n_{bos}))|p(0)|. \quad (50)$$

Proof. We minimize $\max_{z \in [a,b]} |p(z)|$ over polynomials of degree $2n_{bos}$ with given value p(0). Applying an affine transformation $z \rightarrow (2/(b-a))(z-(a+b)/2)$, this is equivalent to minimizing $\max_{z \in [-1,1]} |p(z)|$ over polynomials of degree 2 with given value $p(z_0)$ for $z_0 = (a+b)/(b-a)$. We claim that this is minimized by $cT_{2n_{bos}}(z)$ where $T_{2n_{bos}}$ is a Chebyshev polynomial and $c = p(z_0)/T_{2n_{bos}}(z_0)$. Proof of claim: suppose some other polynomial q(z) has a smaller maximum absolute value on [−1, +1] with $q(z_0) = p(z_0)$. Then the polynomial p(z)−q(z) has a zero at $z_0$ but also has at least $2n_{bos}$ zeros on the interval [−1, +1]; this follows from the intermediate value theorem because $T_{2n_{bos}}$ has $2n_{bos}+1$ extreme points on the interval which alternate signs.

So, $\max_{z \in [a,b]} |p(z)| \geq |c| = |p(z_0)|/|T_{2n_{bos}}(z_0)|$. If $0 \notin [a,b]$ then $|z_0| > 1$. We can bound $T_{2n_{bos}}(z_0)$ for $|z_0| > 1$ by $|z_0|^{2n_{bos}}$ times the sum of absolute values of coefficients of $T_{2n_{bos}}$. This sum of coefficients is bounded by $\exp(O(n_{bos}))$.

Lemma 9 may be applied to lower bound $\max_{y \in [0,1]} |\Sigma_{i \geq 0}$ $$\max_{y \in [0,1]} \left| \sum_{i \geq 0} a_i \left( y + \frac{1-y}{1+x^2} \right)^i \right|.$$

For $$z = y + \frac{1-y}{1+x^2},$$

with b=1 and $a=(1+x^2)^{-1}$, this is $\max_{z \in [a,b]} |p(z)|$ with $p(z) = \Sigma_i a_i z^i$. The following inequality may follow from an application of $(a+b)/(b-a) \leq (2/x^2)$.

$$\max_{y \in [0,1]} \left| \sum_{i \geq 0} a_i \left( y + \frac{1-y}{1+x^2} \right)^i \right| \geq x^{4n_{bos}} \exp(O(n_{bos}))|a_0|. \quad (51)$$

However, for purposes of at least algorithm 7, not just the maximum of this polynomial p(z) over an interval, but also whether this maximum can be approached by sampling it at some small number of discrete points, are considered. Lemma 10 may be relied upon for such considerations.

Lemma 10. Let p(z) be a polynomial of degree $2n_{bos}$. Let [a,b] be an interval which does not contain 0. Then, with probability at least 1/2, if one selects a random point z in the interval [a,b] from the uniform distribution, we have $$|p(z)| \geq \geq \left|\frac{a+b}{b-a}\right|^{-2n_{bos}} \exp(O(n_{bos}))|p(0)|.$$

Proof Apply an affine transformation $z \rightarrow (2/(b-a))(z-(a+b)/2)$, which maps a to −1, b to +1 and 0 to (a+b)/(a−b). Write $p(z) = \Pi_i (z-z_i)$ where $z_i$ are zeros of the polynomial; we multiply by p(z) by a normalization constant so that the highest order coefficient is equal to 1. Then $\log(|p(z)|) = \Sigma_i \text{Re}(\log(z-z_i))$. Let A denote the average of this logarithm over the interval [−1, +1], so $A = \Sigma_i \text{Re}((z-z_i)\log(z-z_i)-(z-z_i))|_{-1}^{+1}$. We will bound the difference $\log(p((a+b)/(a-b))) - A$. We claim that this difference is at most $2n_{bos} \cdot (\log((a+b)/(a-b)) + O(1))$.

To show this consider a given term in this sum which we denote $T_i$, i.e. $T_i = \text{Re}((z-z_i)\log(z-z_i)-(z-z_i))|_{-1,+1}$. For $|z|$ less than or equal to some constant (for example, $|z| \leq 10$), this term is lower bounded by some absolute constant. For $|z|$ larger than this constant (for example, $|z| > 10$), this term is at least $\log(|z|)$ minus some other absolute constant. So, we can bound $D_i \equiv \text{Re}(\log((a+b)/(a-b)-z_i)) - T_i$. If $|z_i| \leq 10$ and $|(a+b)/(a-b)| > 20$, then $D_i \leq \log((a+b)/(a-b)) + O(1)$. If $|z_i| \leq 10$ and $|(a+b)/(a-b)| < 20$, then $D_i \leq O(1)$. If $|z_i| > 10$, then $D_i \leq \text{Re}(\log((a+b)/(a-b)-z_i)-\log(z_i))+O(1) = \text{Re}(\log((a+b)/(a-b)))+O(1)$.

Further, for each i, we see that $\max_{z \in [-1,+1]} \text{Re}(\log(z-z_i))$ is upper bounded by $T_i + O(1)$. Hence, $\max_{z \in [-1,+1]} \log(|p(z)|)$ is upper bounded by $\Sigma_i T_i + O(n_{bos})$. Hence, with probability at least 1/2, if one selects a random point z in the interval [a,b] from the uniform distribution, we have $$|p(z)| \geq \left|\frac{a+b}{b-a}\right|^{-2n_{bos}} \exp(O(n_{bos}))|p(0)|.$$

Hence, with probability at least ½, we have that $\log(|p(z)|) \geq A - 2n_{bos} \cdot (\log((a+b)/(a-b)) - O(n_{bos})$.

Lemma 11 follows from noting that for $$z = y + \frac{1-y}{1+x^2},$$

a uniform choice of z on some interval is equivalent to a uniform choice of y on some other interval.

Lemma 11. For y chosen randomly from the uniform distribution on [0, 1], the quantity $\langle \Psi_{input}^0(y)|E_{PE}|\Psi_{input}^0(y)\rangle$ is greater than or equal to $\langle (\lambda v_{sig}^{\otimes p})^{\otimes n_{bos}/p}|E_{PE}|(\lambda v_{sig}^{\otimes p})^{\otimes n_{bos}/p}\rangle \cdot \exp(-O(n_{bos}))O(x)^{2n_{bos}}$.

Optimizing over x is discussed below. For now, note that selecting, for example, x=0.01, then the tensor $T_0'$ may be selected from the same distribution as $T_0$ up to a multiplication by a factor of $(1+0.01^2)^{1/2}$ which is very close to 1. This leads to only a very small reduction in the threshold $\lambda$ at which recovery is possible. At the same time, the reduction in overlap $(0.01)^{n_{bos}}$ is asymptotically negligible compared to the improvement which is polynomial in $N^{n_{bos}}$. There is also a change in the normalization of the input state, since $|T_0'|$ will typically be larger than $|T_0|$. This change is also negligible.

Additional terms depending on $\delta$ are now considered, e.g., due to the difference $\Psi_{input}(y) - \Psi_{input}^0(y)$. At a surface, not much may be gained by introducing T' since this Gaussian random variable $\delta$ is still considered. However, $\langle \Psi_{input}(y)|E_{PE}|\Psi_{input}(y)\rangle$ is an advantage. The operator $E_{PE}$ may not depend on $\delta$ and the states in the bra and ket may depend on $\delta$ only polynomially (treating the overall normalization as a constant).

An approach is outlined below. The quantity $\langle \Psi_{input}(y)|E_{PE}|\Psi_{input}(y)\rangle$ may have a probability distribution that is peaked near some "small" value, e.g., much less than the value of the overlap at $\delta=0$, rather than some "large" value, e.g., roughly comparable to the value of the overlap at $\delta=0$. To deal with this, additional noise may be added, such that the expectation value of the overlap large, e.g., roughly comparable to the value of the overlap at δ=0. Whether the probability function might have some large probability of having a small value is considered. The theorem of Carbery-Wright on "anti-concentration" of polynomials of Gaussian random variables, bounding the probability that the probability lies in some small interval may be applied. This theorem provides a useful bound, unless the variance of the polynomial is small. However, in that case, it may be shown that the polynomial is likely to be close to its expectation value.

Adding additional noise may be as follows. The input state may be perturbed by adding additional Gaussian random noise, using the input state $$\left| \lambda v_{sig}^{\otimes p} + \left(y + \frac{1-y}{1+x^2}\right)G' + \frac{x(1-y)}{\sqrt{1+x^2}}(\delta+\delta') \right\rangle^{\otimes n_{bos}/p},$$

up to an overall normalization, where δ' is an additional tensor chosen from a Gaussian distribution with some root-mean-square (rms) variance x'. So, the tensor δ+δ' may be sampled from some distribution with variance 1+x'². This input state may be indicated as $\Psi_{input}(y, x')$. Then, the expectation value over δ' of $\langle\Psi_{input}(y, x')|E_{PE}|\Psi_{input}(y, x')\rangle$ may be considered. More specifically, this expectation value may be considered as a series in the variable 1+x'². Using the same treatment as above of this expectation value as a polynomial, it may be shown that if x' is chosen uniformly from the interval [0, x] then, with probability at least ½, the quantum expectation value $\langle\Psi_{input}(y, x')|E_{PE}|\Psi_{input}(y,x')\rangle$ is at least equal to the e quantum expectation value with δ=δ'=0 multiplied by exp(−O($n_{bos}$)) O(x)$^{4n_{bos}}$.

Hence, lemma 12 follows.
Lemma 12. With probability at least ¼, for random choice of y and x', the expectation value over δ, δ' of $\langle\Psi_{input}(y,x')|E_{PE}|\Psi_{input}(y,x')\rangle$ is at least $\langle(\lambda v_{sig}^{\otimes p})^{\otimes n_{bos}/p}|E_{PE}|(\lambda v_{sig}^{\otimes p})^{\otimes n_{bos}/p}\rangle\cdot\exp(-O(n_{bos}))x^{4n_{bos}}$.

Throughout the discussion, G' is considered as fixed and δ, δ' is considered as random. The anti-concentration in the Gaussian random variables δ, δ' may be employed.

Lemma 13 is a consequence of the application of the Carbery-Wright theorem.

Lemma 13. Let $p(z_1, \ldots, z_n)$ be a polynomial of degree at most k in n independent normally distributed random variables. Then, for any t∈ℝ and any δ>0 with |t−𝔼[p]|>δ, $$Pr[|p(z_1,\ldots,z_n)-t|\leq\delta]\leq\left(\frac{\delta}{|t-\mathbb{E}[p]|-\delta}\right)^{2/(2k+1)}O(k)^{2k/(2k+1)} \quad (52)$$

$$\leq\left(\frac{\delta}{|t-\mathbb{E}[p]|-\delta}\right)^{2/(2k+1)}O(k),$$

where the big-O notation here hides a universal constant.
As a corollary, choosing t=0, $$Pr[|p|\leq\delta|\mathbb{E}[p]|]\leq\delta^{2/(2k+1)}O(k). \quad (53)$$

Proof. Let textrmVar(p) denote the variance of p(·). As a trivial bound, $$Pr[|p(z_1,\ldots,z_n)-t|\leq\delta]\leq\text{textrmVar}(p)/(|t-\mathbb{E}[p]|-\delta)^2. \quad (54)$$

By Carbery-Wright, $$Pr[|p(z_1,\ldots,z_n)-t|\leq\delta]\leq O(k)\cdot(\delta/\sqrt{\text{textrmVar}(p)})^{1/k}. \quad (55)$$

Maximizing the bound from Eqs. (54,55) over textrmVar(p), Eq. (52) follows.

Hence, lemma 14 follows from Eq. (53).

Lemma 14. Consider a choice of y, x' such that the expectation value over δ, δ' of the quantum expectation value $\langle\Psi_{input}(y, x')|E_{PE}|\Psi_{input}(y, x')\rangle$ is at least $\langle(\lambda v_{sig}^{\otimes p})^{\otimes n_{bos}/p}|E_{PE}|(\lambda v_{sig}^{\otimes p})\cdot\exp(-O(n_{bos}))x^{4n_{bos}}$. Then, for random choice of δ, δ', the quantum expectation value $\langle\Psi_{input}(y, x')|E_{PE}|\Psi_{input}(y, x')\rangle$ is at least $$\langle(\lambda v_{sig}^{\otimes p})^{\otimes n_{bos}/p}|E_{PE}|(\lambda v_{sig}^{\otimes p})^{\otimes n_{bos}/p}\rangle\cdot\exp(-O(n_{bos}))x^{4n_{bos}}\delta,$$

with probability at least 1−O($n_{bos}$) $\delta^{2/(2n_{bos}+1)}$.

In some embodiments, x=1/log(N). Algorithm 7 is shown below.

---

Algorithm 7
Quantum Algorithm (modified improved input state, unamplified version)

1. Choose random y, x'. Sample $T_0'$, δ' randomly. Prepare input state $$\left| \lambda v_{sig}^{\otimes p} + \left(y + \frac{1-y}{1+x^2}\right)G' + \frac{x(1-y)}{\sqrt{1+x^2}}(\delta+\delta') \right\rangle^{\otimes n_{bos}/p \otimes n_{bos}/p}.$$

2. If the initial state is not in the symmetric subspace, report "failure". If the state is in the symmetric subspace, apply phase estimation using $H(T_0)$ Let ψ be the resulting state. If the resulting eigenvalue is larger than $(E_0 + E_{cut})/2$, report "success". Otherwise, report "failure".

3. If success is reported, measure and return $\langle\psi|a_\mu^\dagger a_\nu \otimes I|\psi\rangle$.

---

Although not shown explicitly in the algorithm, amplitude amplification may be applied in algorithm 7, similarly to algorithm 4 and/or algorithm 6. When applying amplitude amplification, the following assumption may be employed:

$\langle\Psi_{input}(y,x')|E_{PE}|\Psi_{input}(y,x')\rangle$ is at least $$\langle(\lambda v_{sig}^{\otimes p})^{\otimes n_{bos}/p}|E_{PE}|(\lambda v_{sig}^{\otimes p})^{\otimes n_{bos}/p}\rangle\cdot\exp(-O(n_{bos}))x^{4n_{bos}}\delta.$$

From the theorems above, with high probability in δ', this happens at least ¼ of the time. If the assumption does not hold, re-sample y, x' and try again. Theorem 6 follows.

Theorem 6. For $E_0 \geq E_{max}\cdot(1+O(1/\log(N)))$, with probability at least 1−O($n_{bos}$) $\delta^{2/(2n_{bos}+1)}$, the expected runtime of the algorithm is at most poly($N,n_{bos},1/(E_0-E_{max},\log(D(N,n_{bos})/\epsilon))\exp(O(n_{bos}))\times\log(N)^{n_{bos}}(N^{p/4}/\lambda)^{n_{bos}/p}D(N,n_{bos})^{1/4}/\delta$.

As discussed in conjunction with at least algorithm 7, once algorithm 7 succeeds in projecting onto the leading eigenvector, one or more elements of the single particle density matrix are determined (e.g., an matrix element may be measured). It may be necessary to repeat this operation, including both preparing the leading eigenvector and measuring, a total of poly(N, 1/log(ε)) times to measure the single particle density matrix to error ε, and, as explained, it may be necessary to re-run algorithm 7 to prepare the leading eigenvector each time. In at least one embodiment, the multiplicative overhead poly(N, 1/log(ε)) may be turned into an additive overhead using a non-destructive measurement technique. To implement this, the full Hilbert space may be worked in, while the leading eigenvector preparation may be implemented in the symmetric subspace. After preparing the leading eigenvector, the work in returned to the full Hilbert space. A two-outcome projective measurement on a single qudit may be implemented. This measurement may takes us outside the symmetric subspace though it does leave us in a subspace. This subspace may be symmetric under permutation of a subset of $n_{bos}$−1 of the qudits), such as $|\mu\rangle_1\langle\mu|$ for some $\mu$. Using various non-destructive measurement techniques, this two-outcome projective measurements with a projector onto the leading eigenvector may be alternated. That is, the measurements may be implemented approximately using phase estimation as above, to recover the leading eigenvector.

Networks

The language of tensor networks to perform some of the estimates has been used throughout. In this section, the relation to tensor networks is further discussed. Referring to the task of detection so that the spectral algorithms may need only to compute the largest eigenvalue of $H(T_0)$. In this case, it may suffice to evaluate $tr(H(T_0)^m)$ to sufficiently large power m. This trace may be written as a sum of tensor networks. The sum may be present because $H(T_0)$ is a sum of terms. If restricted to the minimum $n_b$ (i.e. $n_{bos}=p/2$ for even p and $n_{bos}=p-1$ for odd p) then no such sum may be present.

Considering a given tensor network N in the sum with $N_T$ tensors in the network, $N_T=m$ may be even p or 2m for odd p. Thus, the network may include $N_E=pN_T/2$ edges. The tensor network N may evaluate to some scalar, denoted as Val(N(T)), where N indicates the network and T indicates what tensor we insert in the network. Consider inserting $\lambda v_{sig}^{\otimes p}$ for every tensor in the network. Under such considerations, the scalar $Val(N(\lambda v_{sig}^{\otimes p}))$ may be equal to $\lambda^{N_T} N^{N_E}$. Suppose instead that G or $\overline{G}$ is inserted for every tensor in the network. It may be possible that $\mathbb{E}[Val(N)]$ is zero, or it is also possible that it is nonzero. However, $\mathbb{E}[|Val(N(G))|^2]$ is computable. This expectation value may be evaluated using various methods. Note that $Val(N(G))|^2$ is equal to the evaluation of some tensor network with $2N_T$ tensors. This network may be given by two copies of N, with all the tensors complex conjugated in one of the two copies. The two copies may be referred to as the first copy and the second copy. This network may be evaluated with $2N_T$ tensors by summing over pairings. Consider just the pairing in which we pair each tensor in the first copy with the corresponding tensor in the second copy. This pairing may contribute $N^{N_E}$ to the expectation value. Hence, since all pairings contribute positively to the expectation value, $\mathbb{E}[|Val(N)|^2]^{1/2} \geq N^{N_E/2}$ follows.

In some embodiments, $\mathbb{E}[|Val(N(G))|^2]^{1/2} \geq Val(N(\lambda v_{sig}^{\otimes p}))$ for $N^{N_E/2} \geq \lambda^{N_T} N^{N_E}$, e.g., for $\lambda \leq N^{-p/4}$. Now, $\mathbb{E}[Val(N(T_0))]$ may differ from $Val(N(\lambda v_{sig}^{\otimes p}))$. However, for any network N, $\lambda v_{sig}^{\otimes p}$, may be inserted, on some set of tensors S in the network and insert G for the remaining tensors in the network. In this case, the expectation value is some number given by summing over pairings of the $N_T-q$ insertions of G. For a given pairing P, consider the following pairing Q on the tensor network which computes $\mathbb{E}[|Val(N(G))|^2]$. For each pair of tensors $T_1$, $T_2$ in P, we pair the first copy of $T_1$ with the first copy of $T_2$ and we pair the second copy of $T_1$ with the second copy of $T_2$. On the other hand, if a tensor T is not paired in P (so T is in S), the first copy of T may be paired with the second copy of T. Using this pairing, and for $\lambda < N^{-p/4}$, the $\mathbb{E}[|Val(N(G))|^2]$ may be greater than or equal to the expectation value of the network N with the given insertions of $\lambda v_{sig}^{\otimes p}$ and G.

So, in this regime and in some embodiments, the rms fluctuations in the expectation value may be comparable to the expectation value itself. However, in other embodiments, it may be possible that by taking a large number of networks in the sum, the rms fluctuations in the sum over networks are small compared to the expectation value of the sum of tensor network.

Generalized Processes for Detection and Recovery

Figure 2:
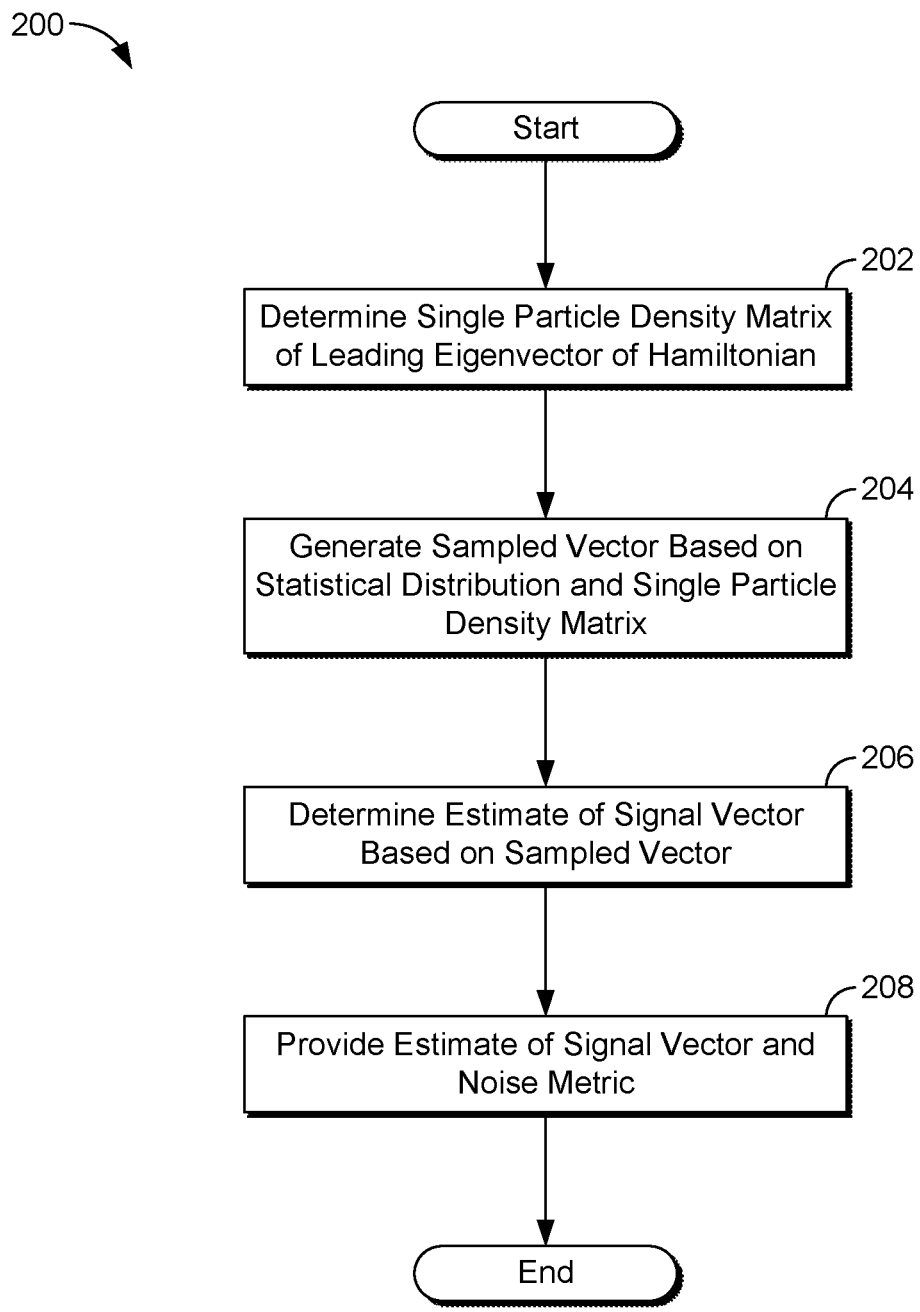
FIG. 2 provides a flow diagram that illustrates an enhanced method for recovering a signal within a dataset, via classical computing systems, that is consistent with some of the embodiments.
Figure 3:
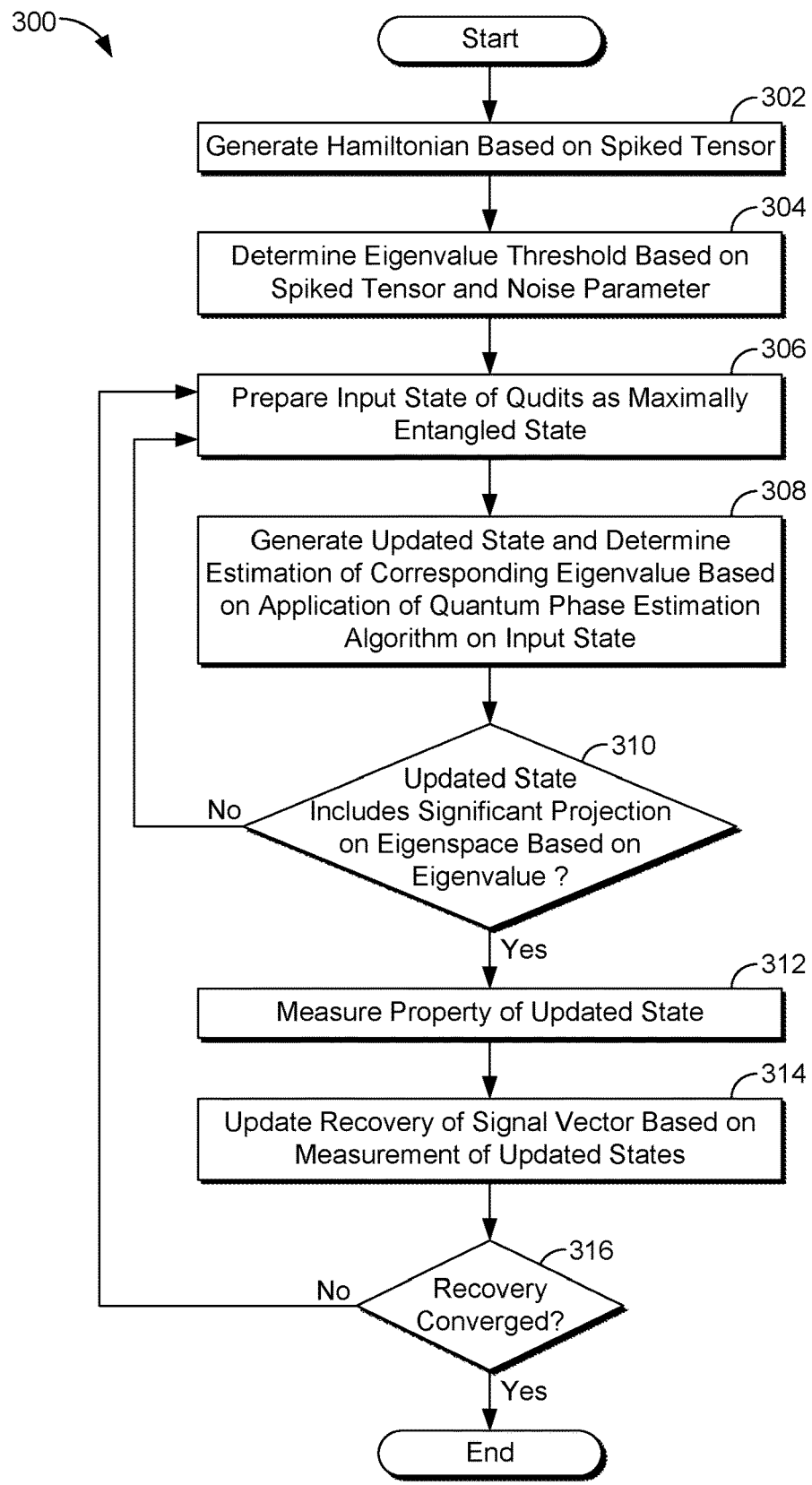
FIG. 3 provides a flow diagram that illustrates a first enhanced method for detecting and recovering a signal within a dataset, via quantum computing system, is consistent with some of the embodiments.
Figure 4A:
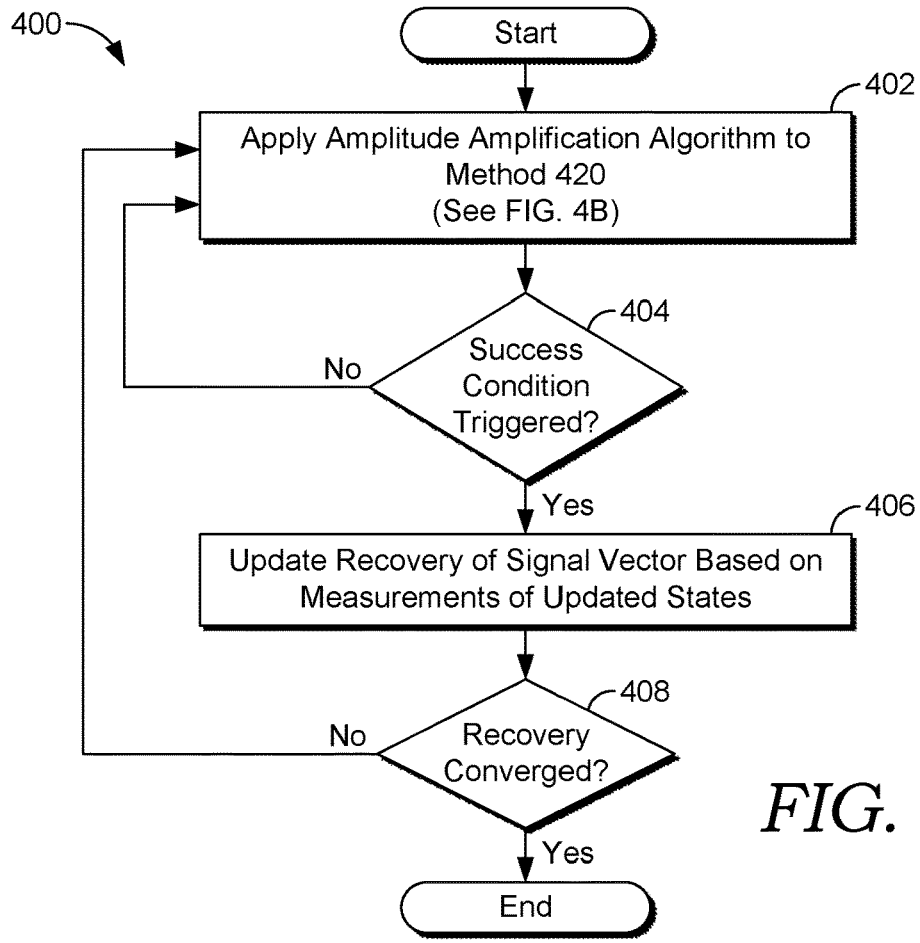
FIGS. 4A-4B provide flow diagrams that illustrate a second enhanced method for detecting and recovering a signal within a dataset, via quantum computing system, that employs amplitude amplification and is consistent with some of the embodiments.
Figure 4B:
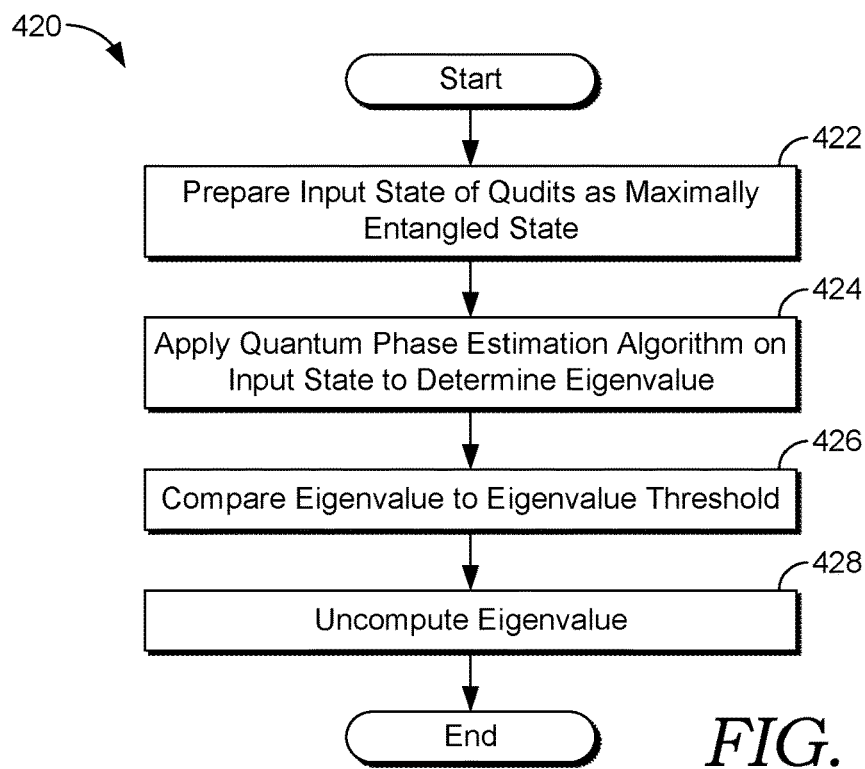
Figure 5:
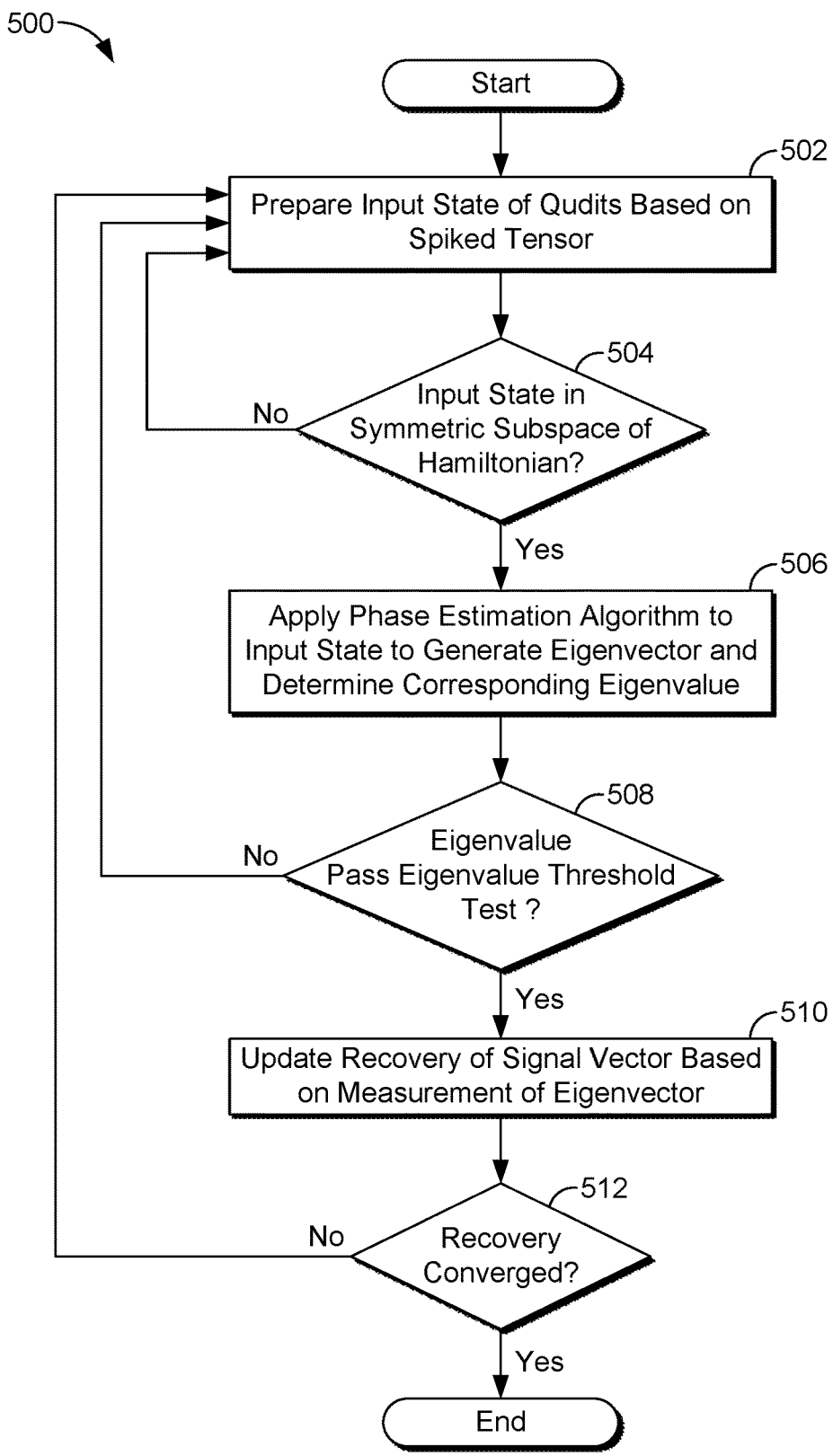
FIG. 5 provides a flow diagram that illustrates a third enhanced method for detecting and recovering a signal within a dataset, via quantum computing system, is consistent with some of the embodiments.
Figure 6A:
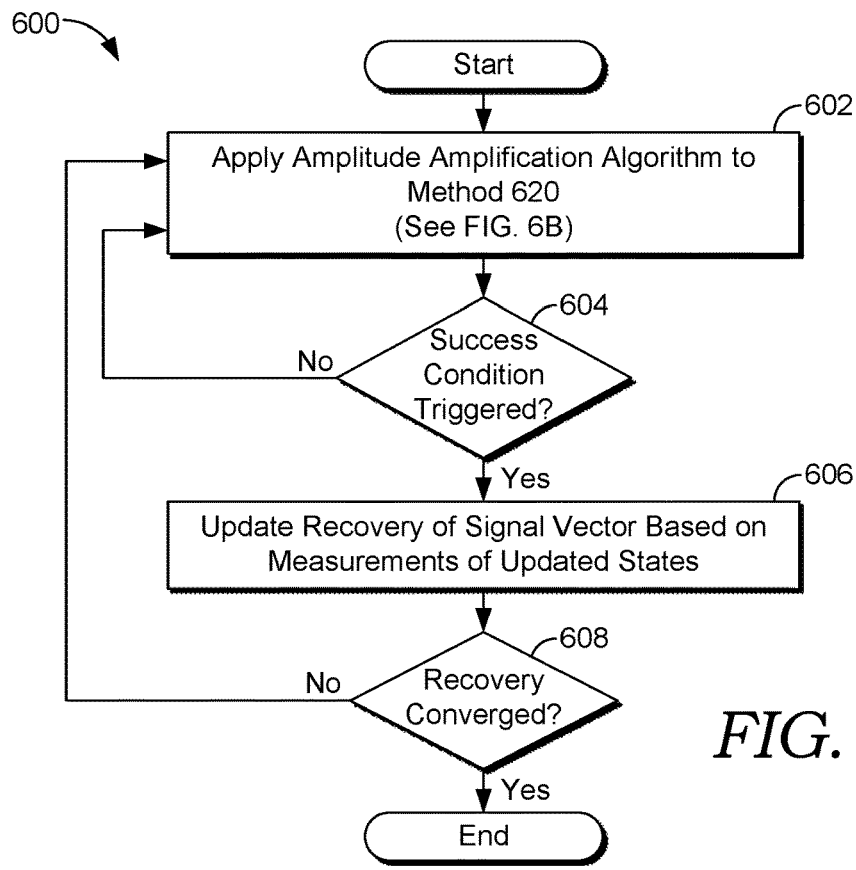
FIGS. 6A-6B provide flow diagrams that illustrate a fourth enhanced method for detecting and recovering a signal within a dataset, via quantum computing system, that employs amplitude amplification and is consistent with some of the embodiments.
Figure 6B:
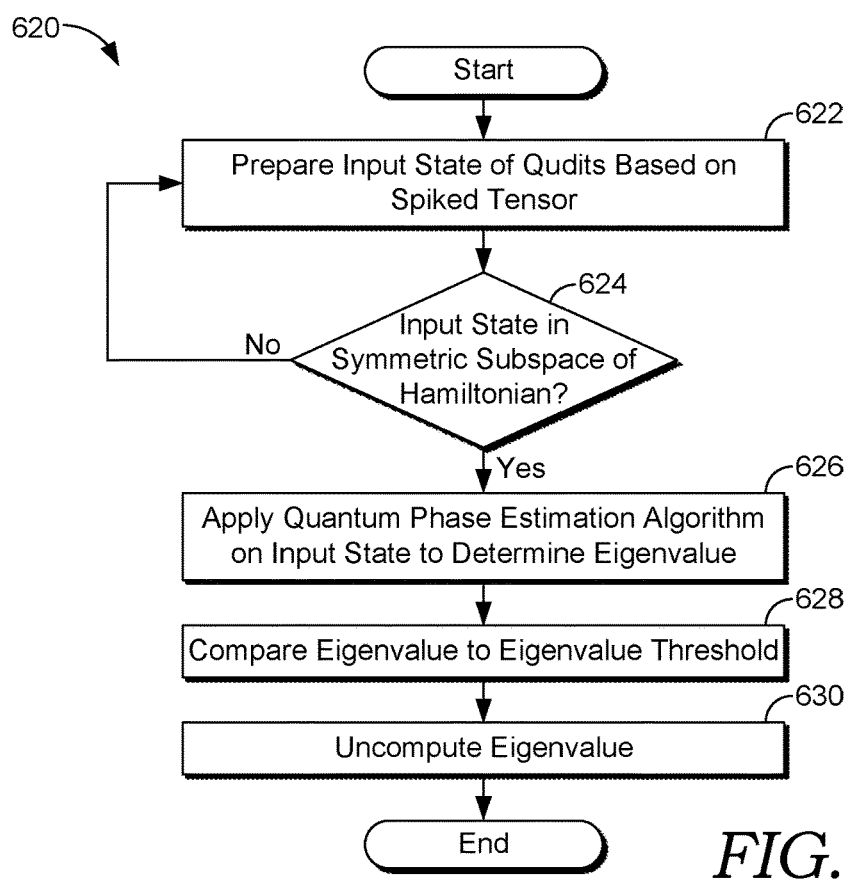
Figure 7A:
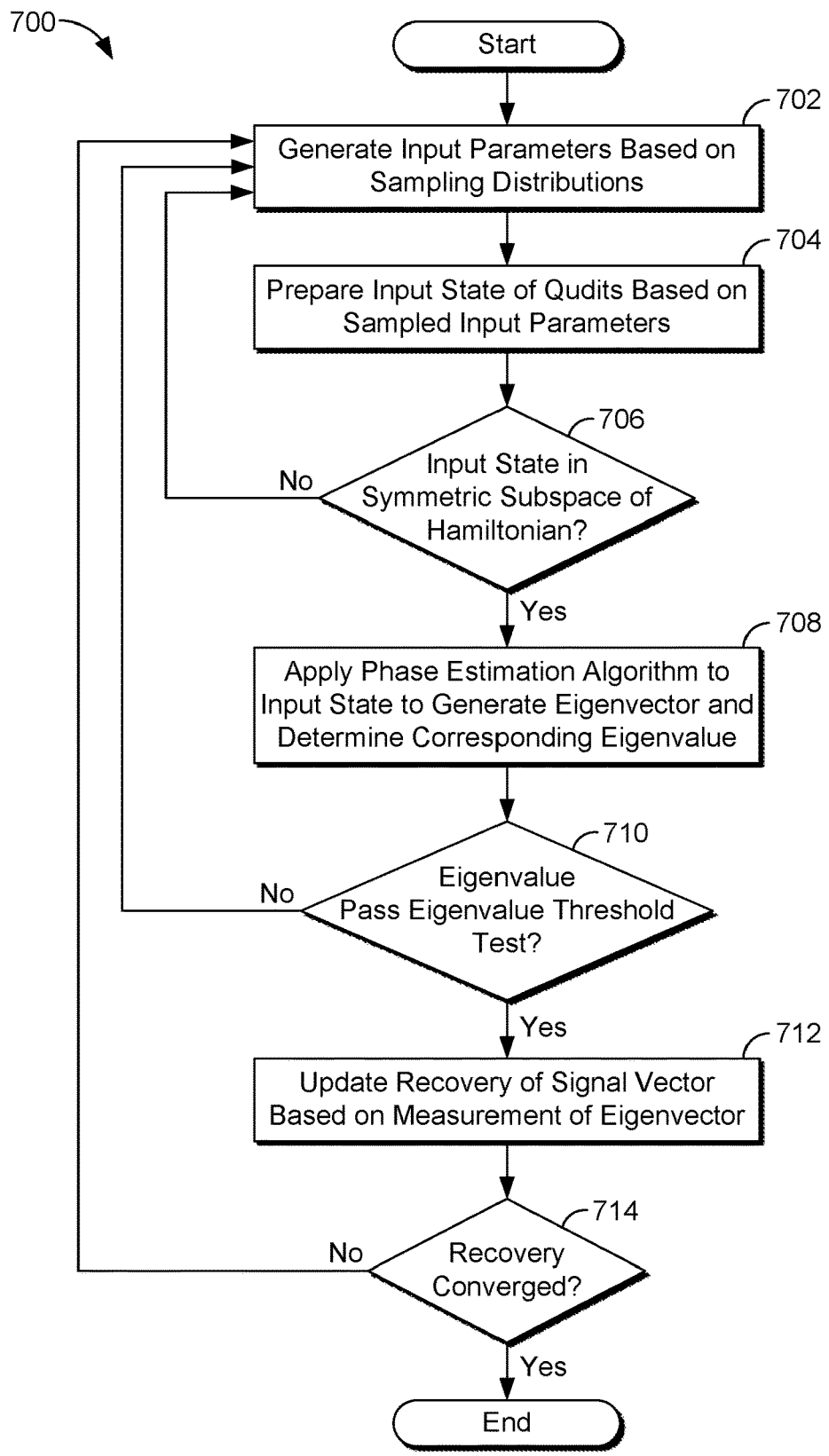
FIGS. 7A-7B provide flow diagrams that illustrate a fifth enhanced method for detecting and recovering a signal within a dataset, via quantum computing system, that employs amplitude amplification and is consistent with some of the embodiments.
Figure 7B:
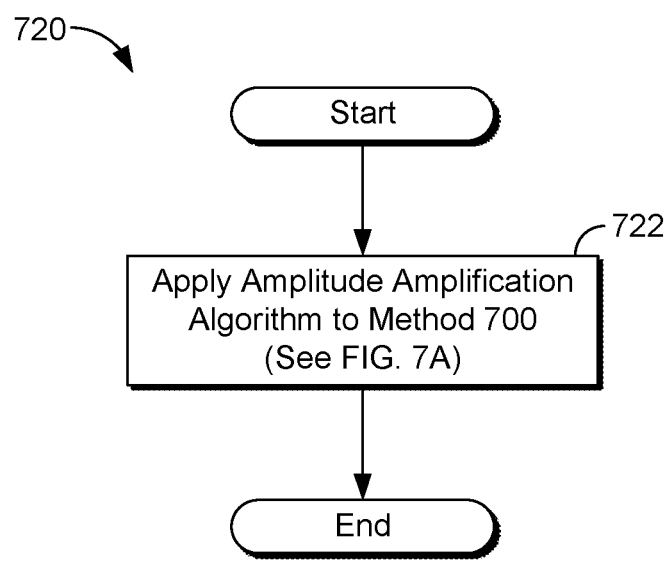

Methods 100 of FIG. 1, 200 of FIG. 2, 300 of FIG. 3, 400 of FIG. 4A, 420 of FIG. 4B, 500 of FIG. 5, 600 of FIG. 6A, 620 of FIG. 6B, 700 of FIG. 7, and 720 of FIG. 7B illustrates processes and/or methods for classical and quantum computation for the principal component analysis (PCA) of multi-dimensional datasets. As such, theses methods, or portions thereof, may be performed and/or executed by classical and/or quantum computing systems, such as but not limited to quantum computing system 800 of FIG. 8, as well as classical computing device 900 of FIG. 9. More particularly, quantum computing system (or environment) 800, computing device 900, and/or a combination thereof may be employed for the task of detection and/or recovery of the principal components of a tensor of rank p, where p is an integer greater than 1, via methods 100-720.

As a general outline for these various embodiments, method 100 of FIG. 1 may implement one or more various embodiments, and/or portions thereof, of algorithm 2. Method 200 of FIG. 2 may be a sub-method of method 100 and may implement one or more various embodiments, and/or portions thereof, of algorithm 1. Accordingly, various embodiments of methods 100 and 200, or at least portions thereof, may be directed towards classical embodiments and may be implemented by and/or performed by one or more classical computing devices, such as but not limited to computing device 900 of FIG. 9.

Figure 8:
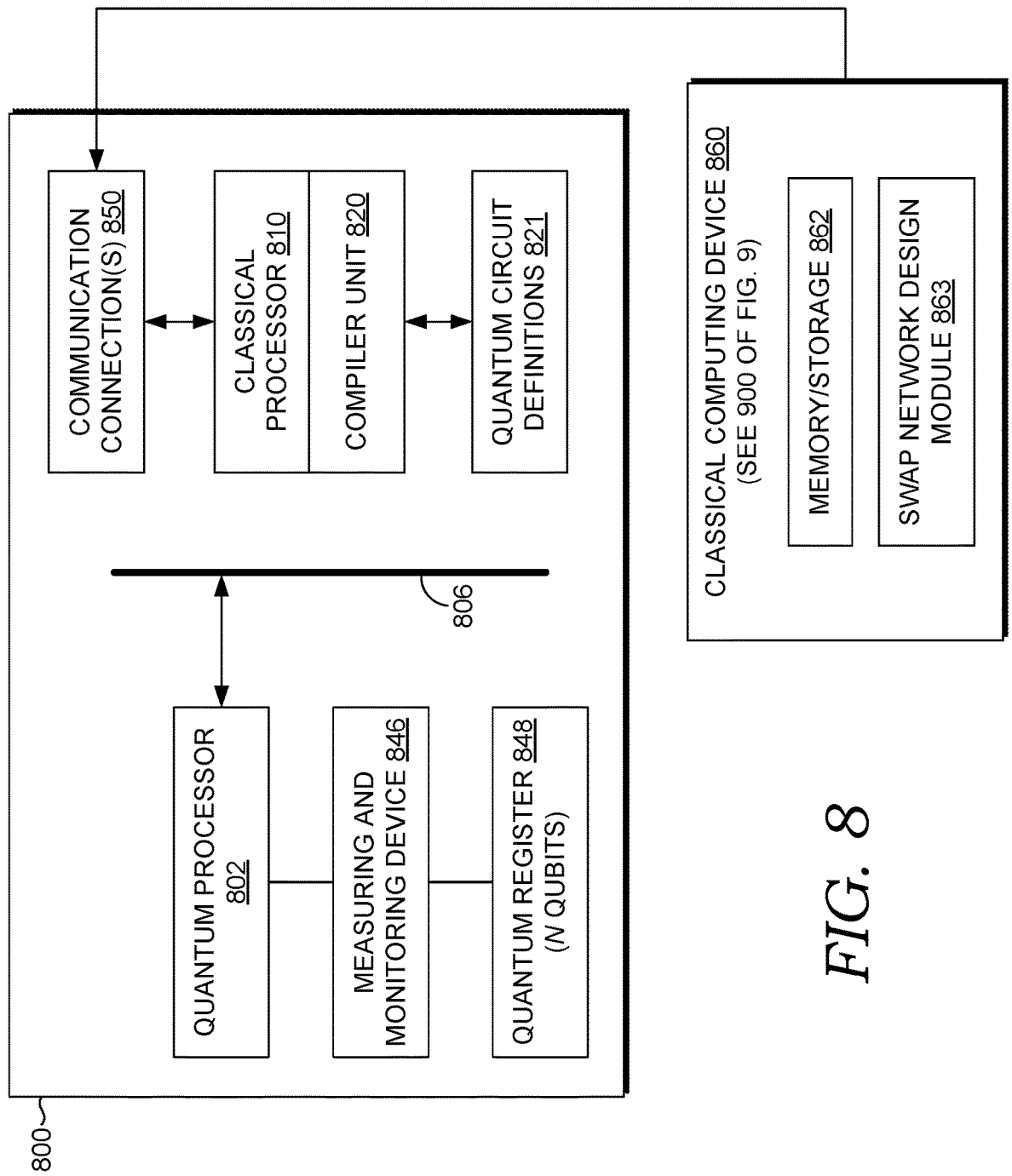
FIG. 8 is a block diagram of an exemplary quantum computing environment suitable for use in implementing an embodiment of the present disclosure.

Methods 300-720 of FIGS. 3-7B described various quantum embodiments, which may be implemented (or at least portions thereof) via quantum computing hardware, such as but not limited to quantum computing environment 800 of FIG. 8. The quantum hardware may perform operations on a set of qudits. More particularly, method 300 of FIG. 3 may implement one or more various embodiments, and/or portions thereof, of algorithm 3. Method 420 of FIG. 4B may be a sub-method of method 400 of FIG. 4A. When performed, methods 400 and 420 may implement one or one or more various embodiments, and/or portions thereof, of algorithm 4. As a reminder, algorithm 4 includes a modification to algorithm 3, where in algorithm 4, an amplitude amplification algorithm is applied to one or more of the steps of algorithm 3.

Method 500 of FIG. 5 may implement one or more embodiments, and/or portions thereof, of algorithm 5, which may be a modification to algorithm 3. The modification of algorithm 5 includes, rather than preparing the input state of the set of qudits as a maximally entangled state (as in algorithm 3), the input state in algorithm 5 is prepared based on an input tensor (e.g., $T_0$). Method 620 of FIG. 6B may be a sub-method of method 600 of FIG. 6A. When performed, methods 600 and 620 may implement one or one or more various embodiments, and/or portions thereof, of algorithm 6. As a reminder, algorithm 6 includes a modification to algorithm 5, where in algorithm 6, an amplitude amplification algorithm is applied to one or more of the steps of algorithm 5.

Method 700 of FIG. 7A may implement one or more embodiments, and/or portions thereof, of algorithm 7, which may be a modification to algorithm 5. The modification of algorithm 5 includes, further basing the input state of the qudits on additional input parameters, which may be sampled and/or selected as described in conjunction with algorithm 7. Method 720 of FIG. 7B includes a modification to method 700, where method 700 is a sub-method of method 720. Similar to the modification that methods 400 and 600 provide to methods 300 and 600 respectively, in method 720, an amplitude amplification algorithm is applied to method 700.

FIG. 1 provides a flow diagram that illustrates an enhanced method 100 for detecting and recovering a signal within a dataset, via classical computing systems, that is consistent with some of the embodiments. Method 100 may implement various embodiments, and/or portions thereof, of algorithm 2. Thus, various embodiments of method 100 may be discussed, at least in conjunction with algorithm 2. Accordingly, even if not explicitly discussed in the conjunction with method 100, method 100 may implement any of the various features and/or operations discussed in conjunction with algorithm 2 and/or any other features and/or operations discussed herein.

Method 100 starts, after a start block, at block 102 where a dataset and a value for a noise parameters are received. The noise vector may be referred to as A throughout. The dataset may include noise. At block 104, a tensor encoding the dataset may be generated. Because the dataset may include noise, the tensor may be "spiked" with noise, and thus may be referred to as a spiked tensor: $T_0$. At block 106, one or more many-body parameters may be determined. In at least one embodiment, the determined many-body parameters may include a positive integer indicating a number of interacting particles (e.g., interacting bosons and/or qudits). Such a many-body parameter may be referred to as $n_{bos}$ throughout. Each of the particles may include N states and/or dimensions. In at least one embodiment, the many-body parameters N and $n_{bos}$ are included in the many-body parameters that are determined at block 106.

At block 108, an eigenvalue threshold may be determined based on the many-body parameters and the rank (e.g., p) of $T_0$. The eigenvalue threshold may be indicated as be indicated as $E_{cut}$. In various embodiments, $E_{cut}$ may depend upon values that are based on the many-body parameters and p, e.g., $E_0$ and/or $E_{max}$. At block 110, a Hamiltonian is generated based on the spiked tensor and the many-body parameters. The generated Hamiltonian may be referred to as $H(T_0)$. At block 112, a leading eigenvector and the corresponding leading eigenvalue of the Hamiltonian are determined. The leading eigenvalue may be indicated as $\lambda_1$. In at least one embodiment, rather than the leading eigenvector, another eigenvector of the Hamiltonian may be found. The corresponding eigenvalue of the determined eigenvector may or may not be greater than the eigenvalue threshold. Even though the below discussion indicates the leading eigenvector and the leading eigenvalue, the embodiments are not so limited, and another eigenvector with a corresponding eigenvalue may be employed in the below blocks. In various embodiments, the leading eigenvector of the Hamiltonian may be the dominant eigenvector of the Hamiltonian and the corresponding leading eigenvalue may be a dominant eigenvalue of the Hamiltonian.

At block 114, a noise metric (e.g., $\lambda$) may be detected. The noise metric may be based on the leading eigenvalue and eigenvalue threshold. In at least one embodiment, if the leading eigenvalue is larger than the eigenvalue threshold, then the noise metric is set to and/or determined to be equal to the value of the noise parameter. Otherwise, the noise metric may be determined equivalent to 0. At decision block 114, it is determined whether the value of the noise metric is positive. If so, then method 100 flows to block 118. If the noise metric is not positively valued, (e.g., if $\lambda=0$) then method flows to decision block 120.

If $\lambda=0$, then detection has failed for the choice of the particular value of the noise parameter. At decision block 120, it is determined whether to select another value for the noise parameter, or whether to terminate method 100. If another value of the noise parameter is to be selected, method 100 flows to block 124. Otherwise, method 100 flows to block 122. At block 122, it may be reported that detection (and thus recovery) has failed, and method 100 may terminate. Otherwise, at block 124, another value for the noise parameter may be selected. Method 100 may return to block 106 to re-determine the many-body parameters based on the updated value of the noise parameter, and detection may be attempted again based on the newly selected noise parameter.

If the noise metric is positive, then detection has succeed and recovery is performed at block 118. At block 118, a signal vector of the spiked tensor may be recovered. The signal vector may be indicated as $v_{sig}$. In at least one embodiment, the signal vector recovered at block 208 may be an estimate of $v_{sig}$. Various embodiments of recovering the signal vector are discussed at least in conjunction with FIG. 2. However, briefly here, $v_{sig}$ may be recovered based on a single particle density matrix of the leading eigenvector of the spiked tensor (e.g., see algorithm 1). The recovered signal vector and the detected noise metric may be reported and/or provided to a user, and process 100 may then terminate.

FIG. 2 provides a flow diagram that illustrates an enhanced method 200 for recovering a signal within a dataset, via classical computing systems, that is consistent with some of the embodiments. Method 200 may implement various embodiments, or portions thereof, of algorithm 1, algorithm 2, and/or a combination thereof. Thus, various embodiments of method 200 may be discussed, at least in conjunction with, algorithm 1 and/or algorithm 2. Accordingly, even if not explicitly discussed in the conjunction with method 200, method 200 may implement and of the various features discussed in conjunction with algorithm 1, algorithm 2, and/or any other feature discussed herein. Method 200 starts, after a start block, at block 202, where a single particle density matrix for the leading (or non-leading) eigenvector of the Hamiltonian is determined and/or generated. For example, the single particle density matrix of the eigenvector determined at block 112 of FIG. 1 may be generated. Various embodiments for determining a particle density matrix are discussed at least in conjunction with step 3 of algorithm 2.

At block 204, a sampled vector is generated based on a statistical distribution (e.g., Gaussian) and the single particle density matrix. Various embodiments of generating a sampled vector are discussed, at least in conjunction with algorithm 1, and in the notation of algorithm 1, the sampled vector may be indicated as u. At block 206, the signal vector, or at least an estimate thereof, is determined. That is, at block 206, the signal vector may be recovered. In the notation of algorithm 1, the signal vector (or estimate thereof) may be indicated as ω. At block 208, the estimated signal vector and/or the detected noise metric may be provided to a user. Method 200 may terminate after block 208.

FIG. 3 provides a flow diagram that illustrates a first enhanced 300 method for detecting and recovering a signal within a dataset, via a quantum computing system, is consistent with some of the embodiments. Method 300 may implement various embodiments, or portions thereof, of algorithm 3. Thus, various embodiments of method 300 may be discussed, at least in conjunction with, algorithm 3. Accordingly, even if not explicitly discussed in the conjunction with method 300, method 300 may implement and of the various features discussed in conjunction with algorithm 3 and/or any other feature discussed herein. Method 300 starts after a start block, at block 302, where a Hamiltonian is generated based on a spiked tensor. At block 304, an eigenvalue threshold may be determined. The eigenvalue threshold may be based on at least one of the spike tensor and/or a noise parameter. At block 306, an input state of qudits is prepared. The input state may be a maximally entangled state of $n_{bos}$ qudits.

At block 308, an updated state of the qudits is generated. In the notation of at least algorithm 3, the updated state may be indicated as $\psi$. In some embodiments, the updated state may be an eigenvector of the Hamiltonian and the corresponding eigenvalue may be determined at block 308. The eigenvector and eigenvalue may be determined by applying a phase estimation algorithm on the input state. In at least one embodiment, the updated state may be the leading eigenvector of the Hamiltonian and the corresponding eigenvalue may be the leading eigenvalue. However, other embodiments are not so limited, and the updated state may not be the leading eigenvector.

At decision block 310, it is determined whether the updated state includes a significant projection onto an eigenspace defined by an eigenvalue that is greater than an eigenvalue threshold. Various embodiments of determining an eigenvalue threshold are discussed in conjunction with at least algorithm 2 and/or method 100 of FIG. 1. In various embodiments, the determination may be based on whether the eigenvalue passes an eigenvalue threshold test (e.g., if the eigenvalue is greater than the eigenvalue threshold), as discussed at least in conjunction with algorithm 3. In various embodiments, comparison between a determined eigenvalue of the Hamiltonian and the eigenvalue threshold may be referred to as "eigenvalue threshold test." If the eigenvalue passes the eigenvalue threshold test, a "success condition" may be triggered. If the eigenvalue does not pass the eigenvalue threshold tests, a "failure condition" may be triggered. When the eigenvalue passes the eigenvalue threshold test, a "success" indicator may be generated, otherwise a "failure" indicator may be generated. Passing the eigenvalue threshold test may indicate that the determined eigenvector includes a significant projection onto an eigenspace defined by an eigenvalue that is greater than an eigenvalue threshold. If the updated state does not include a significant projection onto the eigenspace, method 300 may return to block 306 to prepare another input state. If the updated state includes a significant projection onto the eigenspace, then method 300 flows to block 312.

At block 312, a property of the updated state may be measured, as discussed in conjunction with at least algorithm 3. In at least one embodiment, the measured property may be a matrix element (e.g., the energy for the vacuum state of the updated state) for the matrix operator $a_\mu^\dagger a_\nu$. That is, the vacuum state energy for the updated state may be measured at block 312. Such a measured property may be indicated as $\langle \psi | a_\mu^\dagger a_\nu \otimes I | \psi \rangle$.

At block 314, an estimate for the recovery of the signal vector (e.g., $v_{sig}$) may be updated based on the measurement of block 312. For example, an expectation value of multiple measurements of multiple iterations of method 300 may be determined, as discussed at least in conjunction with algorithm 3. That is, an expectation value for of $a_\mu^\dagger a_\nu$ may be determined at block 314, where the expectation value is based on a plurality of measurements on states via iterating between blocks 306 and 316, as shown in FIG. 3 over a plurality of times. As discussed throughout, $v_{sig}$ may be recovered based on the convergence of the expectation value. At block 316, it is determined whether recovery has adequate converged. The convergence of the recovery may be based on whether the estimated expectation value is statistically significant to an adequate degree. If so, method 300 may terminate. Otherwise, method 300 may return to block 306 for another iteration.

FIGS. 4A-4B provide flow diagrams that illustrate a second enhanced method for detecting and recovering a signal within a dataset, via a quantum computing system, that employs amplitude amplification and is consistent with some of the embodiments. More particularly, the method of FIGS. 4A-4B includes a first method 400 of FIG. 4A and a second method 420 of FIG. 4B. More particularly, method 420 may be a sub-method (e.g., a sub-routine) of method 400. When taken together, methods 400 and 420 include a modification of method 300 of FIG. 3. The modification applies an amplitude amplification algorithm to the operations of method 400. Methods 400 and 420 may implement various embodiments, or portions thereof, of algorithm 4. Thus, various embodiments of methods 400 and 420 may be discussed, at least in conjunction with, algorithm 4. Accordingly, even if not explicitly discussed in the conjunction with methods 400 and 420, methods 400 and 420 may implement and of the various features discussed in conjunction with algorithm 4 and/or any other feature discussed herein.

Referring to FIG. 4A, method 400 starts after a start block, at block 402, where an amplitude amplification algorithm is applied to method 420 of FIG. 4B. As discussed in conjunction with FIG. 4B, as a sub-method of method 400, method 420 may return return a "success" or "failure" indicator, where the success indicator indicates that a determined eigenvalue exceeds an eigenvalue threshold, as discussed in conjunction with at least method 300. At decision block 404, if a success condition is triggered, based on the returned success indicator, method 400 flows to block 406. Otherwise, method 400 may return to block 402.

At block 406, a measurement of the updated state is performed, as discussed throughout. For example, see at least algorithm 3 and/or method 300 of FIG. 3. The recovery of the signal vector is updated based on the measurement. This measurement may be a sampled measurement of a matrix elements. For example, an expectation value of a matrix elements may be updated based on this measurement of the matrix element and a plurality of previously measured estimates of the matrix element, via iterating over method 400. At decision block 408, it is determined whether the recovery of the vector signal has adequately converged. If the recovery has converged, method 400 may terminate. Otherwise, method 400 returns to block 402.

Referring to FIG. 4B, method 420 starts at block 422, where an input state of the qudits is prepared. The prepared state may include a maximally entangled state of the qudits. At block 424, a quantum phase estimation algorithm is applied to the input state to generate an updated state and compute the corresponding eigenvalue. At block 426, the determined eigenvalue is compared to the eigenvalue threshold to determine a success or failure condition. At block 428, the eigenvalue is un-computed. Method 420 may terminate by returning the updated state (e.g., an eigenvector of the Hamiltonian of the tensor), a corresponding eigenvalue, and an indicator of the success or failure condition to method 400.

FIG. 5 provides a flow diagram that illustrates a third enhanced method 500 for detecting and recovering a signal within a dataset, via quantum computing system, is consistent with some of the embodiments. Method 500 may implement various embodiments, or portions thereof, of algorithm 5. Thus, various embodiments of method 500 may be discussed, at least in conjunction with, algorithm 5. Accordingly, even if not explicitly discussed in the conjunction with method 500, method 500 may implement and of the various features discussed in conjunction with algorithm 5 and/or any other feature discussed herein. Method 500 may be similar to method 300 of FIG. 3. However, method 500 may include a modification to the preparation of the input state of the qudits.

Method 500 begins, after a start block, at block 502, where an input state of a set of qubits is prepared. The input state may be based on a spiked tensor (e.g., $T_0$). The input state's dependence on $T_0$ is discussed in conjunction with at least algorithm 5. The input state's dependence on $T_0$ is further discussed in conjunction with at least Eq. (41). The input state prepared at block 502 may be indicated as $\Psi_{input}$. At decision block 504, it is determined whether the input state is in a symmetric subspace of the Hamiltonian. If the input state is not within a symmetric subspace of the Hamiltonian, method 500 may return to block 502 to prepare another input state. If the input state is in the symmetric subspace of the Hamiltonian, then method 500 flows to block 506.

At block 506, a phase estimation algorithm is applied to the input state to generate an eigenvector and determine the corresponding eigenvalue, as discussed throughout. At decision block 508, it is determined whether the eigenvalue passes an eigenvalue threshold test. For example, the eigenvalue may pass the eigenvalue threshold test if the eigenvalue is greater than an eigenvalue threshold. The determination of the eigenvalue threshold is discussed in in conjunction with at least algorithm 3. Passing the eigenvalue threshold test may indicate that the determined eigenvector has a significant projection on the eigenspace defined by the leading (or dominant) eigenvector of the Hamiltonian. If the eigenvalue threshold test is passed, method 500 flows to block 510. Otherwise, method 500 may return to block 502.

At block 510, the recovery of the signal vector is updated based on a measurement of the eigenvector, as discussed throughout. At decision block 512, it is determined whether the recovery of the signal vector has adequately converged (e.g., whether the estimate of the signal vector is stable and/or statistically significant). If convergence has occurred, method 500 may terminate. Otherwise, method 500 may return to block 502.

FIGS. 6A-6B provide flow diagrams that illustrate a fourth enhanced method for detecting and recovering a signal within a dataset, via quantum computing system, that employs amplitude amplification and is consistent with some of the embodiments. More particularly, the method of FIGS. 6A-6B includes a first method 600 of FIG. 6A and a second method 620 of FIG. 6B. More particularly and similarly to methods 400 and 420 of FIGS. 4A-4B, method 620 may be a sub-method (e.g., a sub-routine) of method 600. When taken together, methods 600 and 620 include a modification of method 500 of FIG. 5. The modification applies an amplitude amplification algorithm to the operations of method 500. Methods 600 and 620 may implement various embodiments, or portions thereof, of algorithm 6. Thus, various embodiments of methods 600 and 620 may be discussed, at least in conjunction with, algorithm 6. Accordingly, even if not explicitly discussed in the conjunction with methods 600 and 620, methods 600 and 620 may implement and of the various features discussed in conjunction with algorithm 6 and/or any other feature discussed herein.

Referring to FIG. 6A, method 600 starts after a start block, at block 602, where an amplitude amplification algorithm is applied to method 620 of FIG. 6B. As discussed in conjunction with FIG. 6B, as a sub-method of method 600, method 620 may return return a "success" or "failure" indicator, where the success indicator indicates that a determined eigenvalue exceeds an eigenvalue threshold, as discussed in conjunction with at least method 500. At decision block 604, if a success condition is triggered, based on the returned success indicator, method 600 flows to block 606. Otherwise, method 600 may return to block 602.

At block 606, a measurement of an updated state is performed, as discussed throughout. The updated state may be generated via a phase estimation algorithm of method 620. In at least one embodiment, the updated state may be an eigenvector of the Hamiltonian for the spiked tensor. The recovery of the signal vector is updated based on the measurement. At decision block 608, it is determined whether the recovery of the vector signal has adequately converged. If the recovery has converged, method 600 may terminate. Otherwise, method 600 returns to block 602.

Referring to FIG. 6B, method 620 starts at block 622, where an input state of the qudits is prepared. The prepared state may be based on the spiked tensor. Various embodiments of preparing the input state based on the spiked tensor are discussed at least in conjunction with method 500. At decision block 624, it is determined whether the input state is within the symmetric subspace of the Hamiltonian. If the input state is not within the symmetric subspace, then method 620 returns to block 622. Otherwise, method 620 flows to block 626.

At block 626, a quantum phase estimation algorithm is applied to the input state to generate an updated state and compute the corresponding eigenvalue. At block 628, the determined eigenvalue is compared to the eigenvalue threshold to determine a success or failure condition. At block 630, the eigenvalue is un-computed. Method 620 may terminate by returning the updated state (e.g., an eigenvector of the Hamiltonian), a corresponding eigenvalue, and an indicator of the success or failure condition to method 600.

FIG. 7A provides a flow diagram that illustrates a fifth enhanced method 700 for detecting and recovering a signal within a dataset, via quantum computing system, that employs amplitude amplification and is consistent with some of the embodiments. Method 700 may implement various embodiments, or portions thereof, of algorithm 7. Thus, various embodiments of method 700 may be discussed, at least in conjunction with, algorithm 7. Accordingly, even if not explicitly discussed in the conjunction with method 700, method 700 may implement and of the various features discussed in conjunction with algorithm 7 and/or any other feature discussed herein. Method 700 may be similar to method 500 of FIG. 5. However, method 700 may include a modification to the preparation of the input state of the qudits.

Method 700 begins, after a start block, at block 702, where various input parameters are generated based on one or more sampling and/or statistical distributions. Sampling such input parameters is discussed in conjunction with at least algorithm 7. However, briefly here, input parameters such as y and x' may be chosen. Other input parameters, such as $T_0'$ and $\delta'$ may be sampled randomly based on one or more statistical distributions.

At block 704, an input state for a set of qudits is prepared. The prepared input state may be based on the generated input parameters. Various embodiments of preparing an input state based on the input parameters is discussed in conjunction with at least algorithm 7. At decision block 706, it is determined whether the input state is in a symmetric subspace of the Hamiltonian. If the input state is not within a symmetric subspace of the Hamiltonian, method 700 may return to block 702 to update the input parameters and prepare another input state. If the input state is in the symmetric subspace of the Hamiltonian, then method 700 flows to block 708.

At block 708, a phase estimation algorithm is applied to the input state to generate an eigenvector and determine the corresponding eigenvalue, as discussed throughout. At decision block 710, it is determined whether the eigenvalue passes an eigenvalue threshold test. For example, the eigenvalue may pass the eigenvalue threshold test if the eigenvalue is greater than an eigenvalue threshold. The determination of the eigenvalue threshold is discussed in in conjunction with at least method 100 of FIG. 1 and/or algorithm 3. Passing the eigenvalue threshold test may indicate that the determined eigenvector has a significant projection on the eigenspace defined by the leading eigenvector of the Hamiltonian. If the eigenvalue threshold test is passed, method 700 flows to block 712. Otherwise, method 700 may return to block 702.

At block 712, the recovery of the signal vector is updated based on a measurement of the eigenvector, as discussed throughout. At decision block 714, it is determined whether the recovery of the signal vector has adequately converged. If convergence has occurred, method 700 may terminate. Otherwise, method 700 may return to block 702.

Referring now to FIG. 7B, method 720 provides an alternative method, where method 700 may be performed as a sub-method and/or sub-routine of method 720. Similarly to the discussions in conjunction with at least FIGS. 4A-4B, an amplitude amplification algorithm may be applied to a sub-method. In method 720, and at block 722, an amplitude amplification algorithm is applied to method 700 of FIG. 7A. Method 700 may be performed as a sub-routine of method 720. Thus, method 720 provides an amplitude amplification modification to method 700, in a similar manner that methods 400 and 420 of FIGS. 4A-4B provide an amplitude amplification modification to method 300 of FIG. 3, and also in a similar manner that methods 600 and 620 of FIGS. 6A-6B provide an amplitude amplification modification to method 500 of FIG. 5.

Quantum Computing Environment

FIG. 8 is a block diagram of an exemplary quantum computing environment and/or system 800 suitable for use in implementing embodiments of the present disclosure. Quantum computing environment 800 includes quantum hardware, such as but not limited to a quantum processing unit 802, quantum register, and one or more monitoring/measuring device(s) 846. Quantum register 848 may include physical implementations of N qubits. The qubits may be monitored, measured, observed, or otherwise probed via measuring and monitoring device 846. The quantum processor 802 executes quantum circuits (e.g., circuits implementing the time-evolution operators and parallelized swap networks discussed herein). The circuits may be precompiled by classical compiler unit 820 using one or more classical processor(s) 810. The compiled quantum circuits may be downloaded into the quantum processing unit via quantum bus 806. In some cases, quantum circuits or portions thereof are predefined and stored as quantum circuit definitions in a devices memory 821. For example, quantum circuits associated with second quantization representations of Hamiltonians, as well as quantum circuits implementing qubit swap networks, applied as described above, or other functions and procedures or portions thereof can be stored in a library. A classical computer 860 can be arranged to control a quantum computer or one or more quantum circuits thereof. The classical computer 860 can receive the output of a classical or quantum computer. Based on the received output, the classical computer indicates which quantum circuits are to be used in subsequent quantum computations, provides definitions of suitable quantum circuits, or, in some cases, and controls additional classical computations. The specific architecture depends on the number of qubits, as well as other design considerations. Accordingly, a swap network design module 863 may at least partially automate some of the design work to arrive at the swap network definitions, based on one or more design parameters and/or design criteria. Various embodiments of a classical computing device and/or a classical computing environment are discussed in conjunction with at least FIG. 9.

With reference to FIG. 8, the compilation of quantum circuits may include the process of translation of a high-level description of a quantum algorithm into a sequence of quantum circuits. Such high-level description may be stored, as the case may be, on one or more external computer(s) 860 outside the quantum computing environment 800 utilizing one or more memory and/or storage device(s) 862, then downloaded as necessary into the computing environment 800 via one or more communication connection(s) 850. The high-level description can be stored and interpreted classically, and a classical computer can control the sequence of gates defined in a quantum computer. The high level description also controls application of gates based on initial, intermediate, or final data values. In one example, a memory and/or storage device 862 stores computer executable instructions for coefficient ordering and adjustment as described above. Such instructions can also be provided to the classical processor 810.

Classical Computing Device

Figure 9:
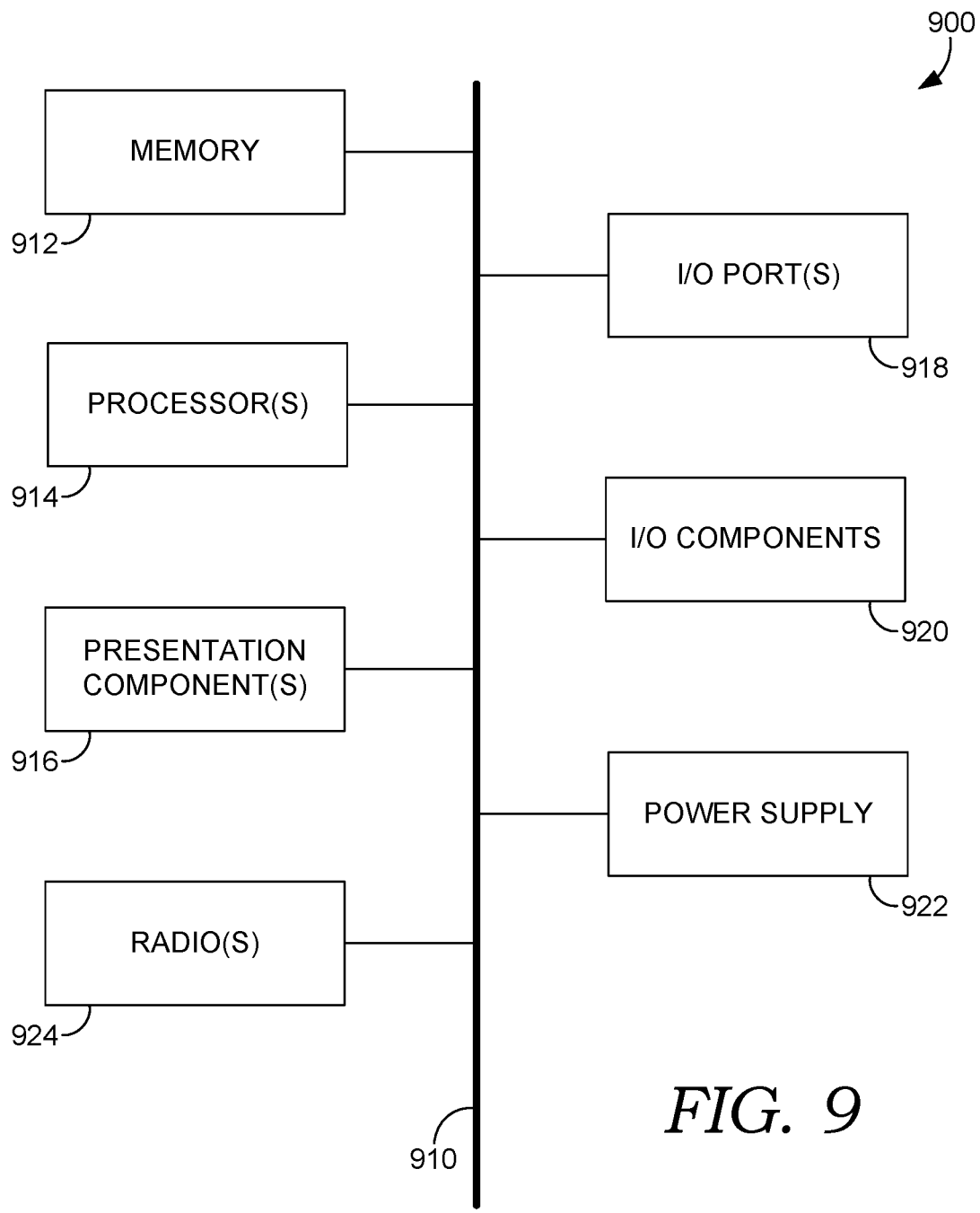
FIG. 9 is a block diagram of an exemplary classical computing environment suitable for use in implementing an embodiment of the present disclosure.

With reference to FIG. 9, classical computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. As discussed in conjunction with FIG. 8, classical computing device 900 may be employed on the quantum computing environment 800 of FIG. 8. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 presents data indications to a user or other device. Examples of presentation components may include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed:

1. Quantum computing hardware configured to operate on a set of qudits to perform a method comprising:
    receiving a dataset encoded in a tensor;
    generating a Hamiltonian for the tensor;
    preparing an input state of the set of qudits;
    based on the input state, employing a phase estimation algorithm to generate an eigenvector of the Hamiltonian; and
    recovering a signal vector of the dataset based on the eigenvector of the Hamiltonian.

2. The quantum computing hardware of claim 1, wherein the input state is a maximally entangled state of the set of qudits.

3. The quantum computing hardware of claim 1, wherein the input state is based on the tensor.

4. The quantum computing hardware of claim 1, wherein an amplitude amplification algorithm is applied to the preparing of the input state and the employing the phase estimation algorithm to generate the eigenvector.

5. The quantum computing hardware of claim 1, wherein the input state is based on randomly sampling the tensor and one or more other input parameters.

6. The quantum computing hardware of claim 1, further comprising:
measuring a property of the eigenvector; and
updating an estimate of the signal vector based on the measured property and a plurality of previously measured properties.

7. The quantum computing hardware of claim 1, wherein the eigenvector is a leading eigenvector for the Hamiltonian.

8. The quantum computing hardware of claim 1, further comprising:
determining an eigenvalue threshold based on a dimensionality of a qudit included in the set of qudits and a rank of the tensor;
in response to determining that an eigenvalue of the eigenvector is greater than the eigenvalue threshold, updating an estimate of the signal vector; and
in response to determining that the eigenvalue of the eigenvector is less than or equal to the eigenvalue threshold, re-preparing the input state of the set of qudits.

9. A computer-implemented method comprising:
receiving a tensor and one or more input parameters;
generating a Hamiltonian for the tensor based on the one or more input parameters;
determining an eigenvector of the Hamiltonian;
recovering a signal vector of the tensor based on the eigenvector of the Hamiltonian.

10. The method of claim 9, further comprising:
determining a particle density matrix for the eigenvector;
generating a sampled vector based on the particle density matrix; and
determining an estimate of the signal vector based on the sampled vector.

11. The method of claim 9, wherein the method is implemented by a classical computing device.

12. The method of claim 9, wherein the one or more input parameters is a noise parameter and the method further comprises:
determining an eigenvalue threshold based on the noise parameter;
comparing an eigenvalue corresponding to the eigenvector and the eigenvalue threshold;
based on comparing the eigenvalue and the eigenvalue threshold, selecting other noise parameter;
determining another eigenvalue threshold based on the other noise parameter;
generating another Hamiltonian for the tensor based on the other noise parameter;
determining another eigenvector of the Hamiltonian;
comparing another eigenvalue corresponding to the other eigenvector and the other eigenvalue threshold; and
based on comparing the other eigenvalue and the other eigenvalue threshold, recovering the signal vector of the tensor based on the other eigenvector of the other Hamiltonian.

13. The method of claim 9, wherein the signal vector indicates a principal of the tensor.

14. The method of claim 9, wherein a rank of the tensor is an odd-integer value that is greater than two.

15. A quantum computing system comprising:
a quantum register that includes a set of qudits; and
quantum computing hardware configured to operate on the set of qudits to perform actions including:
receiving a tensor that encodes a dataset;
generating a Hamiltonian for the tensor;
preparing an input state of the set of qudits;
based on the input state, employing a phase estimation algorithm to generate an eigenvector of the Hamiltonian; and
recovering a signal vector of the dataset based on the eigenvector of the Hamiltonian.

16. The system of claim 15, wherein the dataset is a noisy dataset and the signal vector indicates a signal in the noisy dataset and the actions further include:
detecting a noise parameter based on an eigenvalue corresponding to the eigenvector and an eigenvalue threshold; and
providing the signal vector and a signal-to-noise parameters based on the detected noise parameter.

17. The system of claim 15, wherein the input state is a maximally entangled state of the set of qudits.

18. The system of claim 15, wherein the input state is based on the tensor.

19. The system of claim 15, the actions further including:
applying an amplitude amplification algorithm to the preparing of the input state and the employing the phase estimation algorithm to generate the eigenvector.

20. The system of claim 15, the actions further including:
measuring a property of the eigenvector; and
updating an estimate of the signal vector based on the measured property and a plurality of previously measured properties.

* * * * *